(12) United States Patent
Nakano et al.

(10) Patent No.: US 12,557,104 B2
(45) Date of Patent: Feb. 17, 2026

(54) BASE STATION, COMMUNICATION DEVICE, AND COMMUNICATION METHOD

(71) Applicant: Panasonic Intellectual Property Corporation of America, Torrance, CA (US)

(72) Inventors: Takayuki Nakano, Ishikawa (JP); Tomofumi Takata, Ishikawa (JP); Takashi Iwai, Ishikawa (JP); Hiroyuki Kanaya, Ishikawa (JP); Yoshio Urabe, Nara (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 373 days.

(21) Appl. No.: 18/245,076

(22) PCT Filed: Jul. 29, 2021

(86) PCT No.: PCT/JP2021/028032
§ 371 (c)(1),
(2) Date: Mar. 13, 2023

(87) PCT Pub. No.: WO2022/059359
PCT Pub. Date: Mar. 24, 2022

(65) Prior Publication Data
US 2023/0371026 A1  Nov. 16, 2023

(30) Foreign Application Priority Data

Sep. 17, 2020 (JP) .................. 2020-156398

(51) Int. Cl.
*H04W 72/20* (2023.01)

(52) U.S. Cl.
CPC .................. *H04W 72/20* (2023.01)

(58) Field of Classification Search
CPC ....................... H04L 5/0053; H04W 72/20
See application file for complete search history.

(56) References Cited

U.S. PATENT DOCUMENTS

2021/0409075 A1  12/2021 Yang et al.
2022/0158768 A1* 5/2022 Minotani ............ H04L 1/1896

FOREIGN PATENT DOCUMENTS

CN          111669204 A      9/2020
WO    WO 2021222374 A1    11/2021

OTHER PUBLICATIONS

Guo et al., "A unified transmission procedure for multi-AP coordination," Huawei Technologies, IEEE 802.11-19/1102r0, Jul. 2, 2019. (8 pages).
Guo et al., "Coordinated Spatial Reuse Operation," Huawei Technologies, IEEE 802.11-20/0033r1, Feb. 6, 2020. (14 pages).
International Search Report, mailed Oct. 12, 2021, for International Patent Application No. PCT/JP2021/028032. (3 pages) (with English translation).

(Continued)

*Primary Examiner* — Shukri Taha
(74) *Attorney, Agent, or Firm* — Seed Intellectual Property Law Group LLP

(57) ABSTRACT

This base station comprises: a control circuit that determines a format for a control signal on the basis of the type of cooperative communication; and a transmission circuit that transmits, according to the format, the control signal to another base station.

11 Claims, 24 Drawing Sheets

(56) References Cited

OTHER PUBLICATIONS

Park et al., "Multi-AP Transmission Procedure," LG Electronics, IEEE 802.11-19/0804r0, May 13, 2019. (14 pages).
Ryu et al., "Consideration on multi-AP coordination for EHT," LG Electronics, IEEE 802.11-18/1982r1, Jan. 9, 2019. (11 pages).
Seok et al., "Coordinated OFDMA Operation," MediaTek Inc., IEEE 802.11-19/1788r1, Jan. 14, 2020. (15 pages).
Seok et al., "Coordinated Spatial Reuse (C-SR) Protocol," MediaTek Inc., IEEE 802.11-20/0576r1, May 7, 2020. (21 pages).
Extended European Search Report, dated Jan. 3, 2024, for European Patent Application No. 21869046.9-1215. (9 pages).

\* cited by examiner

| Frame Control | Duration | RA | TA | Common Info | Per AP Info | ...... | Per AP Info | Padding | FCS |

FIG. 1

|  | Sharing AP Tx Power | Sharing AP Acceptable Maximum Interference Level | Shared AP Maximum Tx Power | Shared AP Interference Level | Transmission Parameter (MCS, Sequence Number,...) | STA ID to Suppress | STA Resource Allocation Info to Suppress |
|---|---|---|---|---|---|---|---|
| C-SR | ● | ● | ● | ● | | | |
| C-OFDMA | | | | | | | |
| JT | | | | | ● | | |
| D-MIMO | | | | | ● | | |
| CBF | | | | | | ● | ● |

FIG. 3

| Type value B3 B2 | Type description | Subtype value B7 B6 B5 B4 | Subtype description |
|---|---|---|---|
| 01 | Control | 0000-0001 | Reserved |
| 01 | Control | 0001 | MAP Trigger |
| 01 | Control | 0010 | Trigger |
| 01 | Control | 0011 | TACK |
| 01 | Control | 0100 | Beamforming Report Poll |
| 01 | Control | 0101 | VHT/HE NDP Announcement |
| 01 | Control | 0110 | Control Frame Extension |
| 01 | Control | 0111 | Control Wrapper |
| 01 | Control | 1000 | Block Ack Request (BlockAckReq) |
| 01 | Control | 1001 | Block Ack (BlockAck) |
| 01 | Control | 1010 | PS-Poll |
| 01 | Control | 1011 | RTS |
| 01 | Control | 1100 | CTS |
| 01 | Control | 1101 | Ack |
| 01 | Control | 1110 | CF-End |
| 01 | Control | 1111 | Reserved |

FIG. 8

| index | MAP type |
|---|---|
| 0 | C-SR |
| 1 | C-OFDMA |
| 2 | JT |
| 3 | D-MIMO |
| 4 | CBF |
| . | . |

FIG. 9

| index | MAP type |
|---|---|
| 0 | C-SR |
| 1 | C-OFDMA |
| 2 | JT, D-MIMO |
| 3 | CBF |
| . | . |

FIG. 10

| Trigger Type subfield value | Trigger frame variant |
|---|---|
| 0 | Basic |
| 1 | Beamforming Report Poll (BFRP) |
| 2 | MU-BAR |
| 3 | MU-RTS |
| 4 | Buffer Status Report Poll (BSRP) |
| 5 | GCR MU-BAR |
| 6 | Bandwidth Query Report Poll (BQRP) |
| 7 | NDP Feedback Report Poll (NFRP) |
| 8 | Multi-AP C-SR |
| 9 | Multi-AP C-OFDMA |
| 10 | Multi-AP JT |
| 11 | Multi-AP D-MIMO |
| 12 | Multi-AP CBF |
| 13-15 | Reserved |

FIG. 12

| Trigger Type subfield value | Trigger frame variant |
|---|---|
| 0 | Basic |
| 1 | Beamforming Report Poll (BFRP) |
| 2 | MU-BAR |
| 3 | MU-RTS |
| 4 | Buffer Status Report Poll (BSRP) |
| 5 | GCR MU-BAR |
| 6 | Bandwidth Query Report Poll (BQRP) |
| 7 | NDP Feedback Report Poll (NFRP) |
| 8 | Multi-AP |
| 9-15 | Reserved |

FIG. 14

| METHOD | COMPLEXITY OF PROCESSING | SIGNALING AMOUNT |
|---|---|---|
| EMBODIMENT 4: FIELD LENGTH: VARIABLE | MIDDLE | MIDDLE |
| EMBODIMENT 5: FIELD LENGTH: FIXED | LOW | LARGE |
| EMBODIMENT 5: FIELD LENGTH: VARIABLE | HIGH | SMALL |

FIG. 17

| METHOD | COMPLEXITY OF PROCESSING | SIGNALING AMOUNT |
|---|---|---|
| EMBODIMENT 6 | MIDDLE | LARGE |
| EMBODIMENT 7 | LOW | MIDDLE |
| EMBODIMENT 8 | HIGH | SMALL |

FIG. 24

BASE STATION, COMMUNICATION DEVICE, AND COMMUNICATION METHOD

TECHNICAL FIELD

The present disclosure relates to a radio communication apparatus and a radio communication method.

BACKGROUND ART

In the Institute of Electrical and Electronics Engineers (IEEE), discussions have been made on the IEEE 802.11be (hereinafter, referred to as "11be") standard for a next-generation wireless Local Area Network (LAN), which is a successor to the IEEE 802.11ax (hereinafter, referred to as "11ax") standard. For example, IEEE 802.11ax is also referred to as High Efficiency (HE), and IEEE 802.11be is also referred to as Extreme High Throughput (EHT).

CITATION LIST

Non Patent Literature

NPL 1
  IEEE 802.11-19/0804r0, Multi-AP Transmission Procedure
NPL 2
  IEEE 802.11-19/1788r1, Coordinated OFDMA Operation
NPL 3
  IEEE 802.11-19/1102r0, A unified transmission procedure for multi-AP coordination
NPL 4
  IEEE 802.11-20/0033r1, coordinated spatial reuse operation
NPL 5
  IEEE 802.11-20/0576r1, Coordinated Spatial Reuse Protocol

SUMMARY OF INVENTION

There is scope for further study, however, on a method for controlling coordinated communication in radio communication such as radio LAN or the like.

One non-limiting and exemplary embodiment of the present disclosure facilitates providing a base station, a communication apparatus, and a communication method each capable of enhancing communication efficiency of coordinated communication.

A base station according to the embodiment of the present disclosure includes: control circuitry, which in operation, determines a format of a control signal based on a type of coordinated communication; and transmission circuitry, which in operation, transmits the control signal to another base station in the format.

It should be noted that a general or specific embodiment may be implemented as a system, an apparatus, a method, an integrated circuit, a computer program, a storage medium, or any selective combination thereof.

According to an embodiment of the present disclosure, communication efficiency of coordinated communication can be enhanced.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 1 illustrates an exemplary Multi-AP (MAP) Trigger frame format;
FIG. 3 illustrates exemplary notification information for each MAP type;
FIG. 8 illustrates an exemplary definition of a Frame Control field;
FIG. 9 illustrates an exemplary definition of a MAP type;
FIG. 10 illustrates another exemplary definition of a MAP type:
FIG. 12 illustrates an exemplary definition of a Trigger Type subfield;
FIG. 14 illustrates an exemplary definition of a Trigger Type subfield;
FIG. 17 illustrates a comparative example between Embodiment 4 and Embodiment 5;
FIG. 24 illustrates a comparative example between Embodiments 6, 7, and 8.

DESCRIPTION OF EMBODIMENTS

Hereinafter, embodiments of the present disclosure will be described in detail with reference to the accompanying drawings.

In 11be, for example, application of a Multi-AP (hereinafter, referred to as "MAP") coordination (hereinafter, referred to as "coordinated communication") in which a plurality of access points (AP or also referred to as "base station") cooperatively transmit and receive data to and from each terminal (also referred to as "Station (STA)" or "non- AP STA") has been discussed (e.g., Non Patent Literature (hereinafter, referred to as NPL) 1 to NPL 5).

A plurality of types (e.g., communication types, hereinafter, referred to as "MAP types") have been discussed for coordinated communication in 11be. For example, the MAP types includes the following types.

Coordinated Spatial Reuse (hereinafter, referred to as "C-SR")

Coordinated Orthogonal Frequency Division Multiple Access (hereinafter, referred to as "C-OFDMA")

Joint Transmissions (hereinafter, referred to as "JT")

Coordinated Beamforming (hereinafter, referred to as "CBF")

Note that JT includes, for example, a method for transmitting the same signal from a plurality of coordinating APs and a method for transmitting different transmission streams from a plurality of coordinating APs. A method for transmitting different transmission streams from a plurality of coordinating APs is referred to as, for example, Distributed Multi User—Multiple Input Multiple Output (D-MIMO).

For example, "JT" may be defined as a method for transmitting the same signal from a plurality of coordinating APs, and may be defined as a method different from "D-MIMO". In the following description, a method for transmitting the same signal from a plurality of coordinating APs is defined as "JT", and a method for transmitting different transmission streams from a plurality of coordinating APs is defined as "D-MIMO".

In addition, for example, a MAP Trigger frame (or sometimes referred to as MAP Announcement frame) format has been discussed as a method of controlling coordinated communication. For example, a control procedure for each MAP type or information (notification information) indicated from AP to STA is discussed for a MAP Trigger frame format.

FIG. 1 illustrates an exemplary MAP Trigger frame format based on a Trigger frame format in 11ax. As illustrated in FIG. 1, "Per AP info", which is information (or field) for each AP, may be defined.

Figure 2:
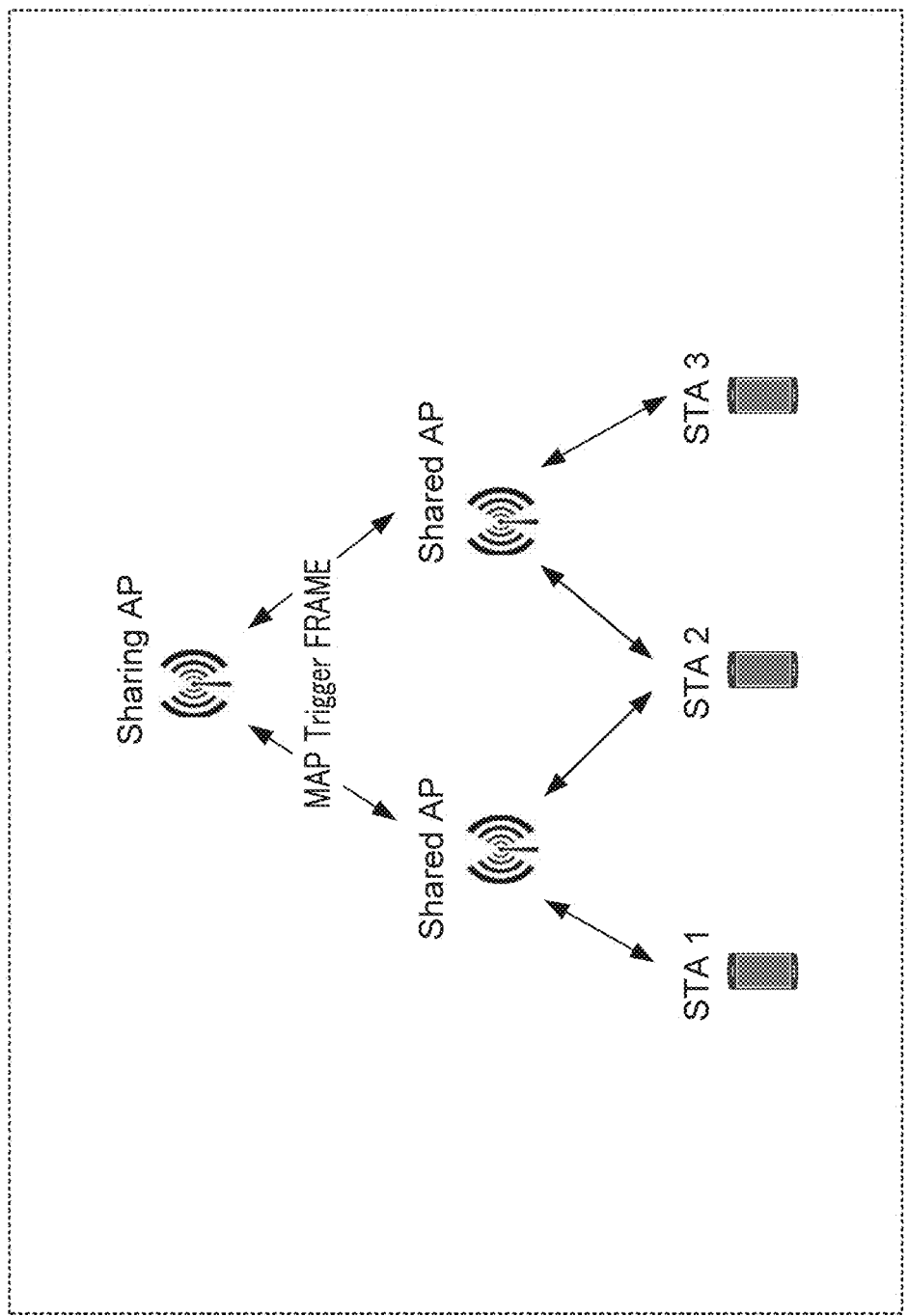
FIG. 2 illustrates an exemplary MAP configuration.

FIG. 2 illustrates an exemplary configuration of APs and STAs (exemplary configuration of MAP) that perform coordinated communication.

In FIG. 2, the "Sharing AP" may be an AP that obtains a channel use (or transmission) period (e.g., Transmission opportunity (TXOP)) and starts (or control) coordinated communication. Further, the "Shared AP" may be an AP that is indicated to perform coordinated communication by the Sharing AP.

Note that, in the embodiment illustrated in FIG. 2, the Sharing AP and the Shared AP are APs different from each other, but the present disclosure is not limited thereto, and any one of Shared APs may also include a function as a Sharing AP, for example. For example, a MAP Trigger frame may be transmitted from a Sharing AP to a Shared AP. The Sharing AP may indicate control (e.g., start) relating to coordinated communication to the Shared APs by transmitting a MAP Trigger frame. The MAP Trigger frame may include information for each Shared AP (e.g., Per AP Info), for example.

In the embodiment of the present disclosure, a method for integrally and efficiently controlling a plurality of MAP types in a MAP Trigger frame (e.g., a configuration of a MAP Trigger frame format) will be described.

[Configuration of Radio Communication System]

The radio communication system according to the present embodiment may include a plurality of APs 100 and STAs 200. AP 100 may include, for example, functions of both Sharing AP and Shared AP, or may include any one of the functions.

For example, AP 100 that is Sharing AP may notify another AP 100 that is Shared AP of a MAP type (e.g., C-SR, C-OFDMA, JT, CBF, or D-MIMO) in a MAP Trigger frame. Note that the term "notify" may be read as "transmit" or "indicate".

Further, for example, AP 100 that is Sharing AP may determine (or change) a format of a MAP Trigger frame based on a MAP type, and may transmit a MAP Trigger frame to another AP 100 that is Shared AP in the determined format.

In this case, parameters (or notification information) notified from the Sharing AP to the Shared AP in the MAP Trigger frame includes a parameter that does not depend on a MAP type (or parameter common to a plurality of MAP types) and a parameter that depends on a MAP type (or a parameters different between a plurality of MAP types). Note that the phrase, "depend on" a MAP type, may be replaced with the term, "based on" a MAP type, for example. The phrase, "not depend on" a MAP, type may be replaced with another term, such as "not based on" or "independent of" a MAP type, for example.

Examples of parameters that do not depend on a MAP type include the following parameters:

Bandwidth (BW),

MAP types (indicating the type of coordinated communication),

Shared AP ID (Identification information on Shared AP), uplink (UL)/downlink (DL) Flag (information indicating either UL or DL), Resource Allocation (Resource Allocation Information)

FIG. 3 illustrates exemplary parameters that depend on a MAP type.

In FIG. 3, parameters corresponding to "●" are parameters notified by a MAP Trigger frame in the corresponding MAP type.

For example, in the MAP type "C-SR" illustrated in FIG. 3, transmission power of Sharing AP and Shared AP (e.g., Sharing AP Tx Power and Shared AP Maximum Tx Power) and allowable interference level (Sharing AP Acceptable Maximum Interference Level and Shared AP Interference Level) of Sharing AP and Shared AP may be notified.

Further, for example, in MAP types "JT" and "D-MIMO" illustrated in FIG. 3, Transmission Parameters such as Modulation and Coding Scheme (MCS), Sequence Number, and Spatial Stream Index may be notified.

Furthermore, for example, in a MAP type "CBF" illustrated in FIG. 3, an STA ID (e.g., STA ID to Suppress) and resource allocation information (STA Resource Allocation Info to Suppress) suppressing interference by beamforming may be notified.

Further, for example, in the MAP type "C-OFDMA" illustrated in FIG. 3, no parameter that depends on the above-described MAP type may be notified.

Note that the above-described parameters that do not depend on a MAP type and the parameters that depend on a MAP type are merely examples, and another parameter may be applied.

Figure 4:
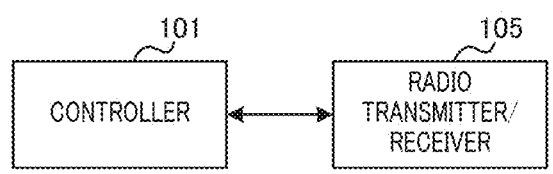
FIG. 4 is a block diagram illustrating an exemplary partial configuration of an AP according to Embodiment 1.

FIG. 4 is a block diagram illustrating an exemplary partial configuration of AP 100 according to the embodiment of the present disclosure. In AP 100 illustrated in FIG. 4, controller 101 (e.g., corresponding to control circuitry) determines a format of a control signal (e.g., MAP Trigger frame) based on a type of coordinated communication (e.g., MAP type). Radio transmitter/receiver 105 (e.g., corresponding to transmission circuitry) transmits a control signal to another base station (e.g., Shared AP), using the above-described format.

Embodiment 1

[Exemplary Configuration of AP 100]

Figure 5:
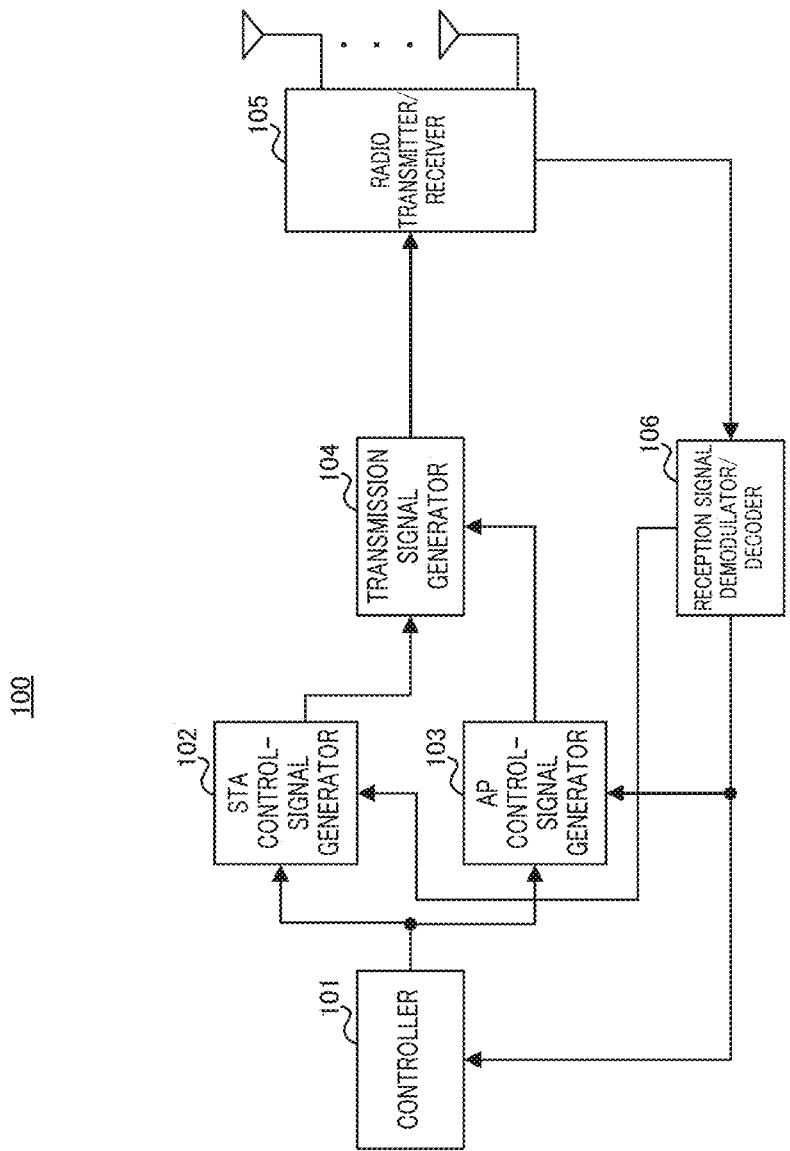
FIG. 5 is a block diagram illustrating an exemplary configuration of the AP according to Embodiment 1.

FIG. 5 is a block diagram illustrating an exemplary configuration of AP 100. AP 100 illustrated in FIG. 5 may include, for example, controller 101, control signal generator for STA (hereinafter, referred to as STA control-signal generator) 102, control signal generator for AP (hereinafter, referred to as AP control-signal generator) 103, transmission signal generator 104, radio transmitter/receiver 105, and reception signal demodulator/decoder 106.

For example, controller 101 may control a configuration of a MAP Trigger frame. For example, when AP 100 is Sharing AP, controller 101 may control generation of a control signal (e.g., MAP Trigger frame) for another AP 100 (e.g., Shared AP). For example, controller 101 may determine a MAP Trigger frame format based on a MAP type. Further, when AP 100 is Shared AP, controller 101 may identify a MAP Trigger frame format based on the information on the MAP type in the MAP Trigger frame transmitted from another AP 100 (e.g., Sharing AP).

Note that an exemplary MAP Trigger frame format will be described later.

Further, controller 101 may configure control information for STA 200 or another AP 100, for example. For example, controller 101 may configure information on resource allocation for each STA 200 and scheduling information such as MCS. Furthermore, controller 101 may determine a parameter relating to transmission control (e.g., a parameter relating to coordinated communication described above) based on information input from reception signal demodulator/decoder 106 (e.g., control information notified from Sharing AP to Shared AP). Controller 101 may, for example, output control information including the determined transmission control parameter to STA control-signal generator 102 and AP control-signal generator 103.

STA control-signal generator 102 may generate, for example, a control signal for STA 200 (e.g., Trigger frame), and output the generated control signal to transmission signal generator 104.

AP control signal generator 103 may generate, for example, a control signal for AP 100 (e.g., MAP Trigger frame). For example, AP control-signal generator 103 may generate a control signal based on the control information input from controller 101 and the information input from reception signal demodulator/decoder 106.

For example, the control signal for AP 100 may include, in addition to time and frequency resource information (e.g., RU allocation information for uplink coordinated communication, TXOP, LENGTH, or the like), at least one of the parameters relating to coordinated communication (e.g., a MAP type, a parameter that does not depend on the MAP type, or a parameter that depends on the MAP type). AP control-signal generator 103 outputs the generated control signal to transmission signal generator 104, for example.

For example, transmission signal generator 104 may perform transmission processing on the control signal or data and ACK/Block-ACK input from STA control-signal generator 102 or AP control-signal generator 103, and may generate a radio frame (transmission signal). Transmission signal generator 104 outputs the generated transmission signal to radio transmitter/receiver 105.

Radio transmitter/receiver 105, for example, performs radio transmission/reception processing, such as D/A conversion or up-conversion to a carrier frequency, on the transmission signal input from transmission signal generator 104, and transmits the signal after the radio transmission/reception processing via an antenna.

For example, when AP 100 receives an uplink signal transmitted from STA 200 or a control signal transmitted from another AP 100, AP 100 may operate as described below.

The radio signal received via an antenna is input to radio transmitter/receiver 105. Radio transmitter/receiver 105, for example, performs radio reception processing such as down-conversion of a carrier frequency on the received radio signal, and outputs the signal after the reception processing to reception signal demodulator/decoder 106.

For example, reception signal demodulator/decoder 106 may perform processing such as autocorrelation processing on the signal input from radio transmitter/receiver 105, and extract the received radio frame. Further, reception signal demodulator/decoder 106 may, for example, decode and demodulate an uplink signal (e.g., response signal or feedback information) from STA 200 or a control signal (e.g., MAP Trigger frame) from another AP 100 included in the extracted radio frame. Reception signal demodulator/decoder 106 may, for example, output the control signal after demodulation to controller 101, STA control-signal generator 102, and AP control-signal generator 103.

[Exemplary Configuration of STA 200]

Figure 6:
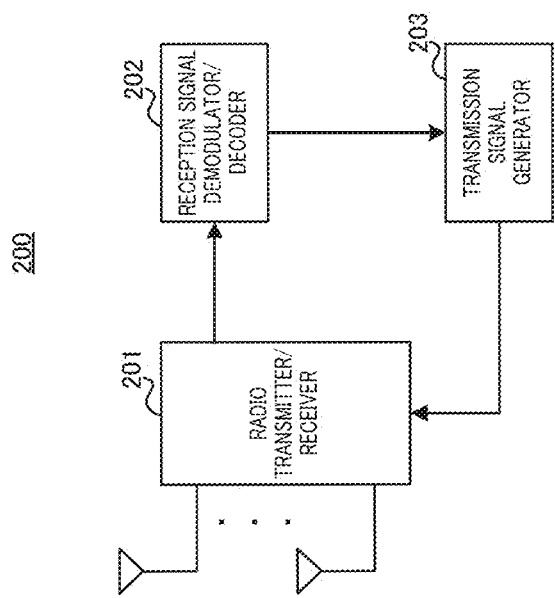
FIG. 6 is a block diagram illustrating an exemplary configuration of an STA according to Embodiment 1.

FIG. 6 is a block diagram illustrating an exemplary configuration of STA 200 according to the present embodiment. STA 200 illustrated in FIG. 6 may include, for example, radio transmitter/receiver 201, reception signal demodulator/decoder 202, and transmission signal generator 203.

Radio transmitter/receiver 201, for example, receives a signal transmitted from AP 100 via an antenna, performs radio reception processing such as down-conversion or A/D conversion on the received signal, and outputs the signal after the reception processing to reception signal demodulator/decoder 202. Further, radio transmitter/receiver 201 may, for example, perform radio transmission processing such as D/A conversion and up-conversion to a carrier frequency on the signal inputted from transmission signal generator 203, and transmit the signal after the radio transmission processing via an antenna.

For example, reception signal demodulator/decoder 202 may perform processing such as autocorrelation processing on the signal input from radio transmitter/receiver 201, and extract the received radio frame. Reception signal demodulator/decoder 202 may, for example, demodulate and decode a control signal (e.g., Trigger frame) included in the extracted radio frame, and obtain an uplink transmission control parameter. Reception signal demodulator/decoder 202 may, for example, output the obtained uplink transmission control parameter to transmission signal generator 203.

Transmission signal generator 203 may perform transmission signal processing on an uplink signal (e.g., response signal) based on the uplink transmission control parameter input from reception signal demodulator/decoder 202, and generate a radio frame (transmission signal). Transmission signal generator 203 outputs, for example, the generated transmission signal to radio transmitter/receiver 201.

[Exemplary Configuration of MAP Trigger Frame Format]

Next, an exemplary configuration of a MAP Trigger frame format according to the present embodiment will be described.

In the present embodiment, a case where MAP types of a plurality (e.g., all) of Shared APs are common will be described.

When MAP types of a plurality of Shared APs are common, AP 100 (Sharing AP) may, for example, notify another AP 100 of the MAP type in a "MAP type" field placed in a common information (e.g., Common Info) field including information common to the plurality of Shared APs in the MAP Trigger frame. In other words, a MAP type (information indicating a type of coordinated communication) may be included in the field for notifying a MAP type in Common Info. Note that the term "place" may be replaced with another term such as "map" or "configure", for example.

Further, AP 100 may, for example, determine (or change) a format of MAP type dependent common information (e.g., MAP Type Dependent Common Info) in a Common Info field and a format of MAP type dependent information (e.g., MAP Type Dependent Info) in an individual information (e.g., Per AP Info) field individual for each of a plurality of Shared APs, based on the MAP type to be notified to the plurality of Shared APs.

Figure 7:
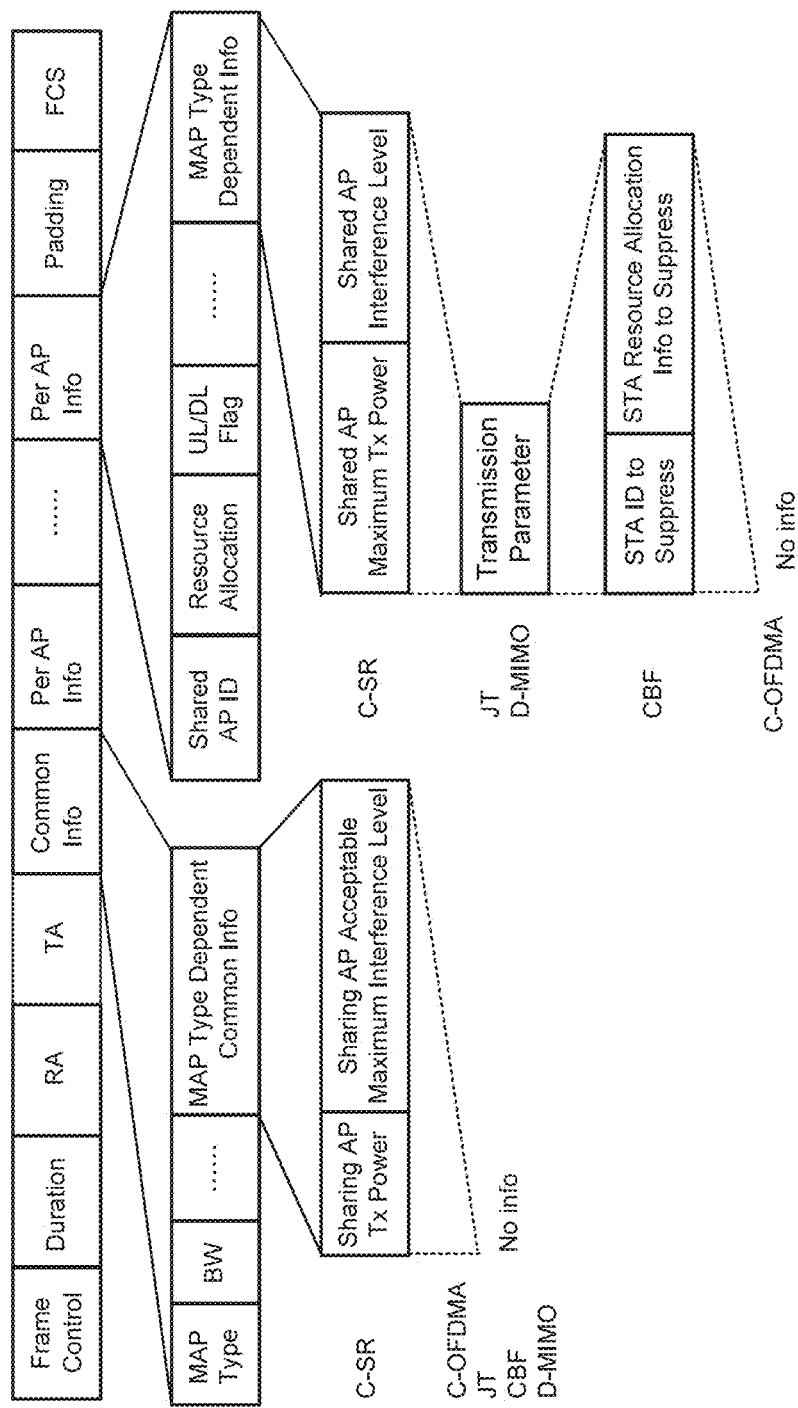
FIG. 7 illustrates an exemplary MAP Trigger frame format according to Embodiment 1.

FIG. 7 illustrates an exemplary MAP Trigger frame format according to the present embodiment.

For example, the frame type being configured to "Map Trigger" may be notified to Shared AP by a "Frame Control" field (e.g., Type and Subtype Subfields). FIG. 8 illustrates an exemplary definition of Type and Subtype subfields in a Frame Control field. FIG. 8 selectively illustrates Control types in 11ax as an example. In the example illustrated in FIG. 8, Subtype for MAP Trigger is defined in Subtype value "0001", which is a Reserved value in 11ax. Note that the definition in the Frame Control field is not limited to the example illustrated in FIG. 8, and Subtype value for MAP Trigger may be defined to another value (e.g., another Reserved value).

In FIG. 7, notification information (or common information) common to a plurality of Shared APs may be configured in a Common Info field, for example. The common information for the plurality of Shared APs may include, for example, common information that does not depend on a MAP type (or information common to a plurality of MAP types), or common information that depends on a MAP type (or information different between MAP types, MAP Type Dependent Common Info).

Common information that does not depend on a MAP type may include, for example, information on a MAP type and bandwidth (BW).

The common information that depends on a MAP type may include, for example, information such as Sharing AP Tx Power and Sharing AP Acceptable Maximum Interference Level.

FIG. 9 and FIG. 10 illustrate exemplary definitions of MAP types. For example, the exemplary definition of MAP types (hereinafter, referred to as "definition example 1") illustrated in FIG. 9 is an example in which each MAP type is assigned with an index. Further, for example, the exemplary definition of MAP types illustrated in FIG. 10 (hereinafter, referred to as "definition example 2") is an example in which MAP types using a similar parameter, such as JT and D-MIMO, are grouped into one and the MAP types are assigned with indexes. For example, MAP type definition example 2 of MAP types can reduce the table size of MAP types as compared with definition example 1.

In FIG. 7, in a Per AP Info field, for example, notification information (or individual information) individual for Shared AP may be configured. The individual information for each Shared AP may be, for example, information common to STAs 200 associating with (or connecting to) Shared AP. The individual information for each Shared AP may include, for example, individual information that does not depend on a MAP type (or individual information common to a plurality of MAP types), and individual information that depends on a MAP type (or individual information different between MAP types, MAP Type Dependent Info).

Individual information that does not depend on a MAP type may include, for example, a Shared AP ID, Resource Allocation, and a UL/DL Flag.

Further, the individual information that depends on a MAP type may include, for example, the following information.

For C-SR: Shared AP Maximum Tx Power, Shared AP Interference Level

For JT or D-MIMO: Transmission Parameter (e.g., MCS, Sequence Number, . . . )

For CBF: STA ID to Suppress, STA Resource Allocation Info to Suppress

For C-OFDMA: None

Note that the BW in FIG. 7 may be the same as or different from the definition of "UL BW subfield" in a Common Info field of the Trigger frame format in 11ax, for example. Further, Resource Allocation in FIG. 7 may be, for example, the same as or different from the definition of "RU Allocation subfield" in a User Info field of the Trigger frame format in 11ax.

Further, for example, AP 100 may determine the size and location of RU based on the same method as a RU Allocation subfield and a Spatial Configuration subfield of a User Specific field defined in a Common field of HE-SIG-B in 11ax or a method extended for 11be.

Further, for example, in an RU Allocation subfield in 11ax, an RU less than 20 MHz in size is defined, but the RU is not limited thereto, and for example, 20 MHz or greater in size may be defined for an RU in Resource Allocation.

As described above, in the present embodiment, AP 100 (Sharing AP) notifies another AP 100 (Shared AP) of a MAP type by a MAP type field placed in a Common info field, and notifies another AP of MAP type dependent common information (e.g., MAP Type Dependent Common Info) and MAP type dependent information (MAP Type Dependent Info) corresponding to the MAP type in a MAP Trigger frame. In other words, in a MAP Trigger frame, the contents of MAP type dependent common information and MAP type dependent information are changed based on the MAP type.

This configuration of a MAP Trigger frame allows AP 100 to notify another AP 100 of a control signal corresponding to each of the plurality of MAP types, which can enhance efficiency of signaling. Therefore, according to the present embodiment, communication efficiency of coordinated communication can be enhanced.

Embodiment 2

The configuration of APs and STAs according to the present embodiment may be the same as that in Embodiment 1.

In the present embodiment, for example, similarly to Embodiment 1, a case where MAP types of a plurality (e.g., all) of Shared APs are common will be described.

When MAP types are common to a plurality of Shared APs, AP100 (Sharing AP) may notify another AP (Shared AP) of a MAP type of MAP Trigger in a Trigger Type field (e.g., the same as a Trigger for UL in 11ax), for example. In other words, a MAP type (information indicating a type of coordinated communication) may be included in the field for indicating a Trigger type in Common Info.

Further, AP 100 may, for example, determine (or change) formats of MAP type dependent common information (e.g., MAP Type Dependent Common Info) in a Common Info field and MAP type dependent information (e.g., MAP Type Dependent Info) in a Per AP Info field based on MAP types notifying a plurality of Shared APs.

Figure 11:
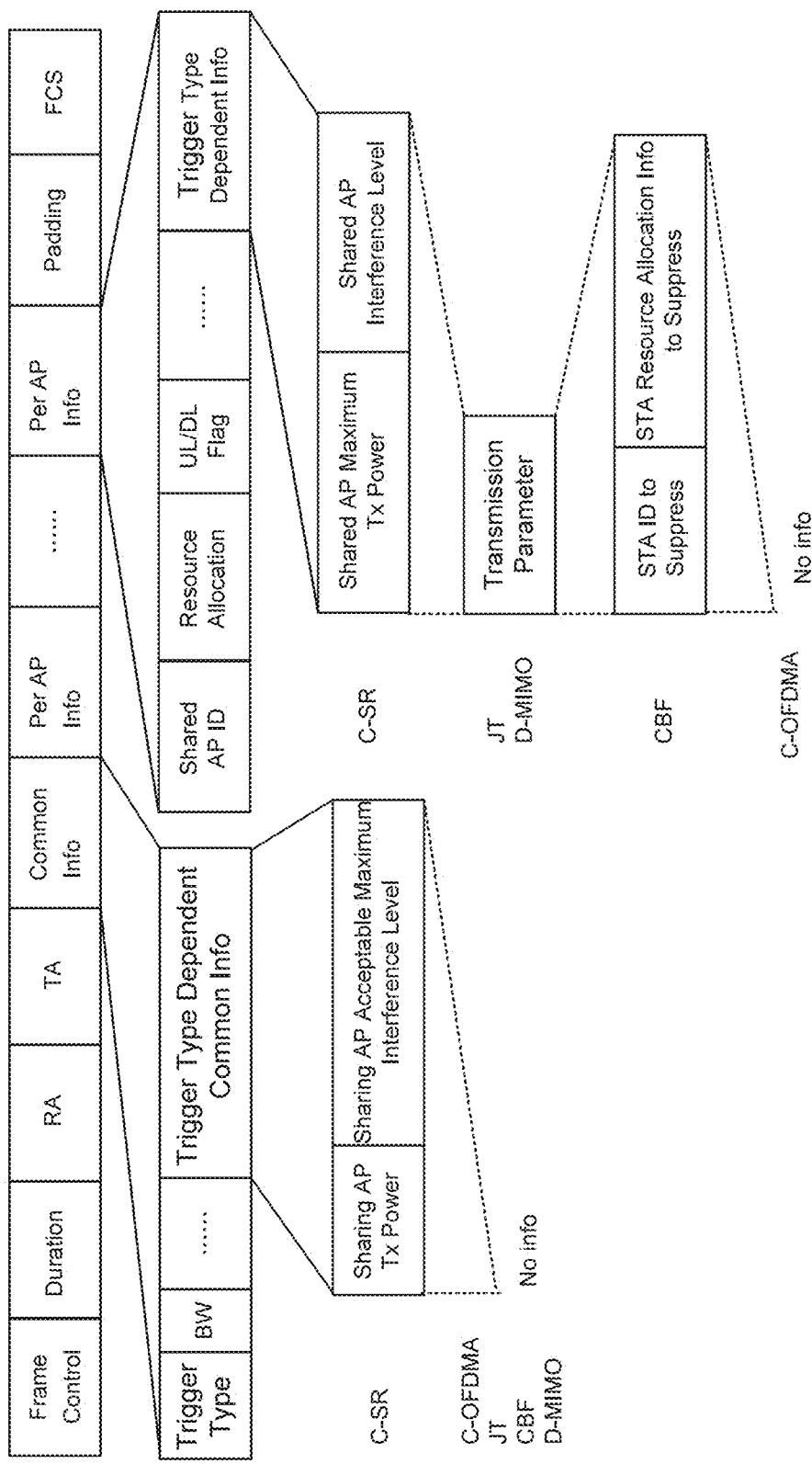
FIG. 11 illustrates an exemplary MAP Trigger frame format according to Embodiment 2.

FIG. 11 illustrates an exemplary MAP Trigger frame format according to the present embodiment. Further, FIG. 12 illustrates an exemplary definition of Trigger Type subfields.

For example, as illustrated in FIG. 12, a plurality of MAP types are defined in values 8 to 12 of Trigger Type subfields (e.g., Table 9 to 31b) in 11ax, respectively. By this definition of MAP types, Shared AP may identify (or recognize or decide) a MAP type in Trigger Type in a Common Info field illustrated in FIG. 11.

Note that, in FIG. 11, common information (e.g., BW) that does not depend on a MAP type in a Common Info field may be the same as in Embodiment 1, for example.

Further, in FIG. 11, Trigger type dependent common information in a Common Info field (e.g., Trigger Type Dependent Common Info) may be the same as MAP type dependent common information (MAP Type Dependent Common Info) in Embodiment 1, for example.

Furthermore, in FIG. 11, individual information (e.g., Shared AP ID, Resource Allocation, and UL/DL Flag) that is placed in a Per AP Info field and does not depend on a MAP type may be the same as that in Embodiment 1, for example.

In addition, in FIG. 11, Trigger type dependent information (e.g., Trigger Type Dependent Info) in a Per AP Info field may be the same as MAP type dependent information (e.g., MAP Type Dependent Info) in Embodiment 1, for example.

As described above, in the present embodiment, AP 100 notifies another AP 100 of a MAP type of MAP Trigger by a Trigger Type field in a MAP Trigger frame. Further, AP 100, for example, notifies another AP 100 of Trigger type dependent common information (e.g., Trigger Type Dependent Common Info) and Trigger type dependent information (Trigger Type Dependent Info) corresponding to the MAP type notified in a Trigger Type field. In other words, in a MAP Trigger frame, the formats of Trigger type dependent common information and Trigger type dependent information are changed based on a MAP type, similarly to Embodiment 1.

This configuration of a MAP Trigger frame allows AP 100 to notify another AP 100 of a control signal corresponding to each of the plurality of MAP types, which can enhance efficiency of signaling. Therefore, according to the present embodiment, communication efficiency of coordinated communication can be enhanced.

Embodiment 3

The configuration of APs and STAs according to the present embodiment may be the same as that in Embodiment 1.

In the present embodiment, for example, similarly to Embodiment 1, a case where MAP types of a plurality (e.g., all) of Shared APs are common will be described.

When MAP types are common to a plurality of Shared APs, AP100 (Sharing AP) may notify another AP 100 (Shared AP) of MAP Trigger in a Trigger Type field (e.g., the same as a Trigger for UL in 11ax), for example. Further, AP 100 may, for example, notify another AP 100 of a MAP type in a Trigger type dependent common information (e.g., Trigger Type Dependent Common Info) fields. In other words, in Common Info, information triggering MAP coordination (coordinated communication) is included in the field for notifying a trigger type, and a MAP type (information indicating the type of coordinated communication) is included in the field depending on the Trigger type.

Further, AP100 may determine (or change) a format of MAP type dependent common information (e.g., MAP Type Dependent Common Info) in Trigger type dependent common information (e.g., Trigger Type Dependent Common Info) in a Common Info field, and a format of Trigger Type dependent information (e.g., Trigger Type Dependent Info) in a Per AP Info field, based on MAP types indicated to a plurality of Shared APs.

Figure 13:
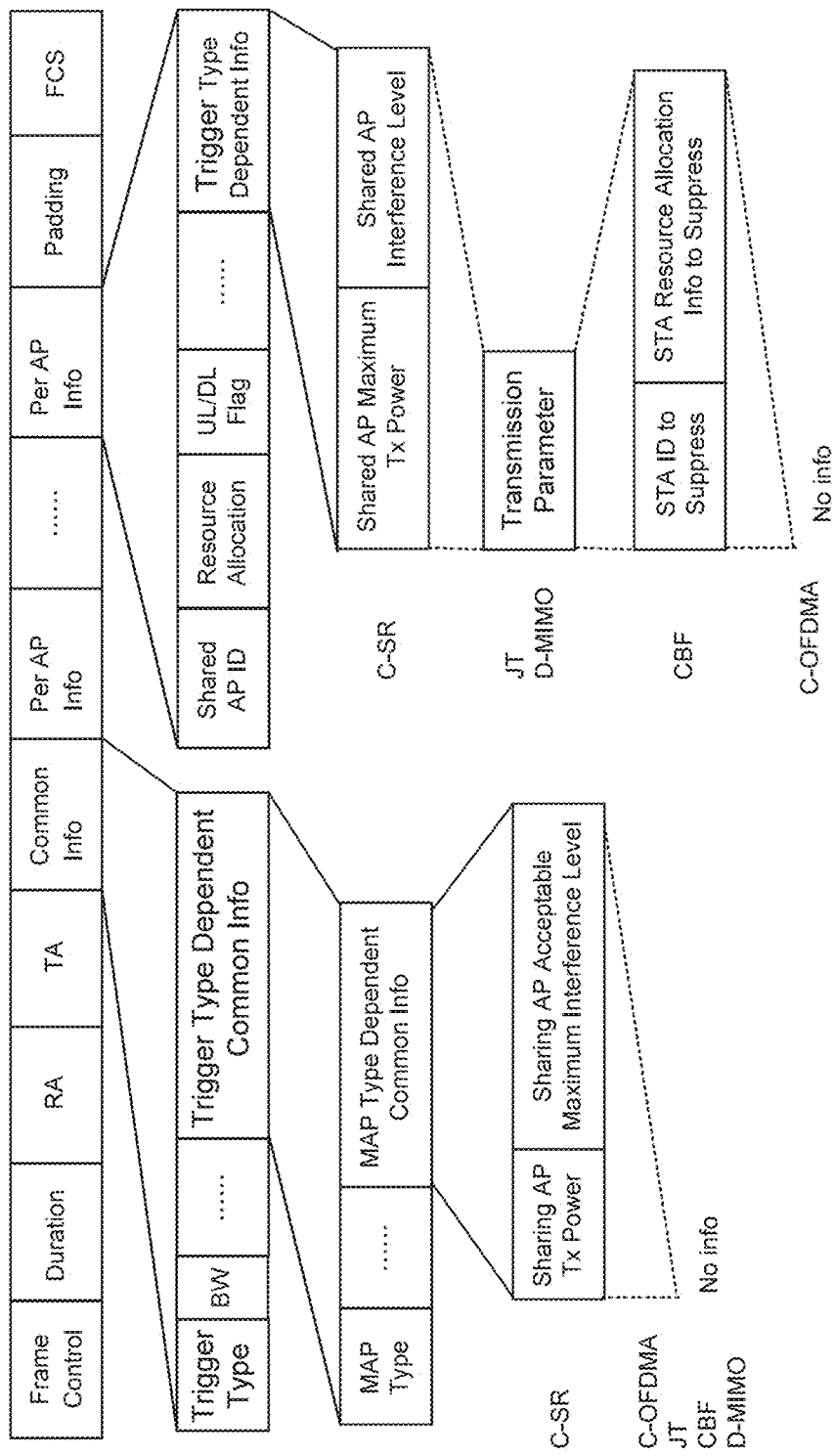
FIG. 13 illustrates an exemplary MAP Trigger frame format according to Embodiment 3.

FIG. 13 illustrates an exemplary MAP Trigger frame format according to the present embodiment. Further, FIG. 14 illustrates an exemplary definition of Trigger Type subfield.

For example, as illustrated in FIG. 14, MAP (Multi-AP) is defined in value 8 of a Trigger Type subfield (e.g., Table 9-31b) in 11ax. By this definition of MAP, Shared AP may recognize a Trigger Type in Common Info illustrated in FIG. 13 as MAP.

Further, for example, a MAP Type field may be placed in Trigger type dependent common information (e.g., Trigger Type Dependent Common Info) in a Common Info field. Shared AP may, for example, identify (or recognize, determine) a MAP type in a MAP Type field in a Common Info field of the MAP Trigger frame whose Trigger Type is MAP.

Note that, in FIG. 13, common information (e.g., BW) that does not depend on a MAP type in a Common Info field may be the same as in Embodiment 1, for example.

Further, in FIG. 13, MAP type dependent common information (e.g., MAP Type Dependent Common Info) in a Common Info field may be the same as MAP type dependent common information (MAP Type Dependent Common Info) in Embodiment 1, for example.

Further, in FIG. 13, individual information (e.g., Shared AP ID, Resource Allocation, and UL/DL Flag) that is placed in a Per AP Info field and does not depend on a MAP type may be the same as that in Embodiment 1, for example.

Furthermore, in FIG. 13, MAP type dependent information (e.g., Trigger Type Dependent Info) in a Per AP Info field may be the same as MAP type dependent information (e.g., MAP Type Dependent Info) in Embodiment 1, for example.

As described above, in the present embodiment, AP100 notifies another AP 100 that MAP is triggered by a Trigger Type field in a MAP Trigger frame, and notifies another AP 100 of a MAP type in a MAP Type field in Trigger type dependent common information (Trigger Type Dependent Common Info). Further, AP 100, for example, notifies another AP 100 of Trigger type dependent common information (e.g., Trigger Type Dependent Common Info) and Trigger type dependent information (Trigger Type Dependent Info) corresponding to the notified MAP type. In other words, in a MAP Trigger frame, the formats of Trigger type dependent common information and Trigger type dependent information are changed based on a MAP type.

This configuration of a MAP Trigger frame allows AP 100 to notify another AP 100 of a control signal corresponding to each of the plurality of MAP types, which can enhance efficiency of signaling. Therefore, according to the present embodiment, communication efficiency of coordinated communication can be enhanced.

Comparison of Embodiments 1, 2, and 3

For example, the complexities of the processing regarding the MAP Trigger frame formats of Embodiments 1, 2, and 3 are equivalent to each other.

Further, for example, in terms of the signaling of a MAP Trigger frame format, Embodiments 1, 2, and 3 are different from each other in that notification of being a MAP Trigger and notification of a MAP type are performed in the following fields.

Embodiment 1: Frame Control and MAP type (MAP Type) in Common Info
Embodiment 2: Trigger Type in Common Info
Embodiment 3: Trigger Type in Common Info and MAP type (MAP Type) in Trigger type dependent common information (Trigger Type Dependent Common Info)

Thus, for example, the format to be applied may be determined among MAP Trigger frame formats of Embodiments 1, 2, and 3, considering a definition area used for other uses different from the MAP configuration.

For example, when an unused area (e.g., Reserved area) in a definition area of a Frame Control subtype (e.g., FIG. 8) is large compare to a definition area of a Trigger Type subfield (e.g., FIG. 12 or FIG. 14), a MAP Trigger frame format of Embodiment 1 may be applied. On the other hand, for example, when an unused area (e.g., Reserved area) in a definition area of a Trigger Type subfield (e.g., FIG. 12 or FIG. 14) is large compare to a definition area of a Frame Control subtype (e.g., FIG. 8), a MAP Trigger frame format of Embodiment 2 or 3 may be applied.

Embodiment 4

The configuration of APs and STAs according to the present embodiment may be the same as that in Embodiment 1.

In the present embodiment, for example, a case where a MAP type is different between a plurality of Shared APs will be described.

When a MAP type is different between Shared APs, AP 100 (Sharing AP) may, for example, notify another AP (Shared AP) of a MAP type for each of a plurality of Shared APs in a MAP Type field placed in a Common Info field. In other words, a MAP type (information indicating the type of coordinated communication) for each of the plurality of Shared APs may be included in Common Info (e.g., MAP Type field).

Further, AP 100 may, for example, determine (or change) formats of MAP type dependent common information (e.g., MAP Type Dependent Common Info) and MAP type dependent information (e.g., MAP Type Dependent Info) based on a MAP type indicated to each of a plurality of Shared APs.

Figure 15:
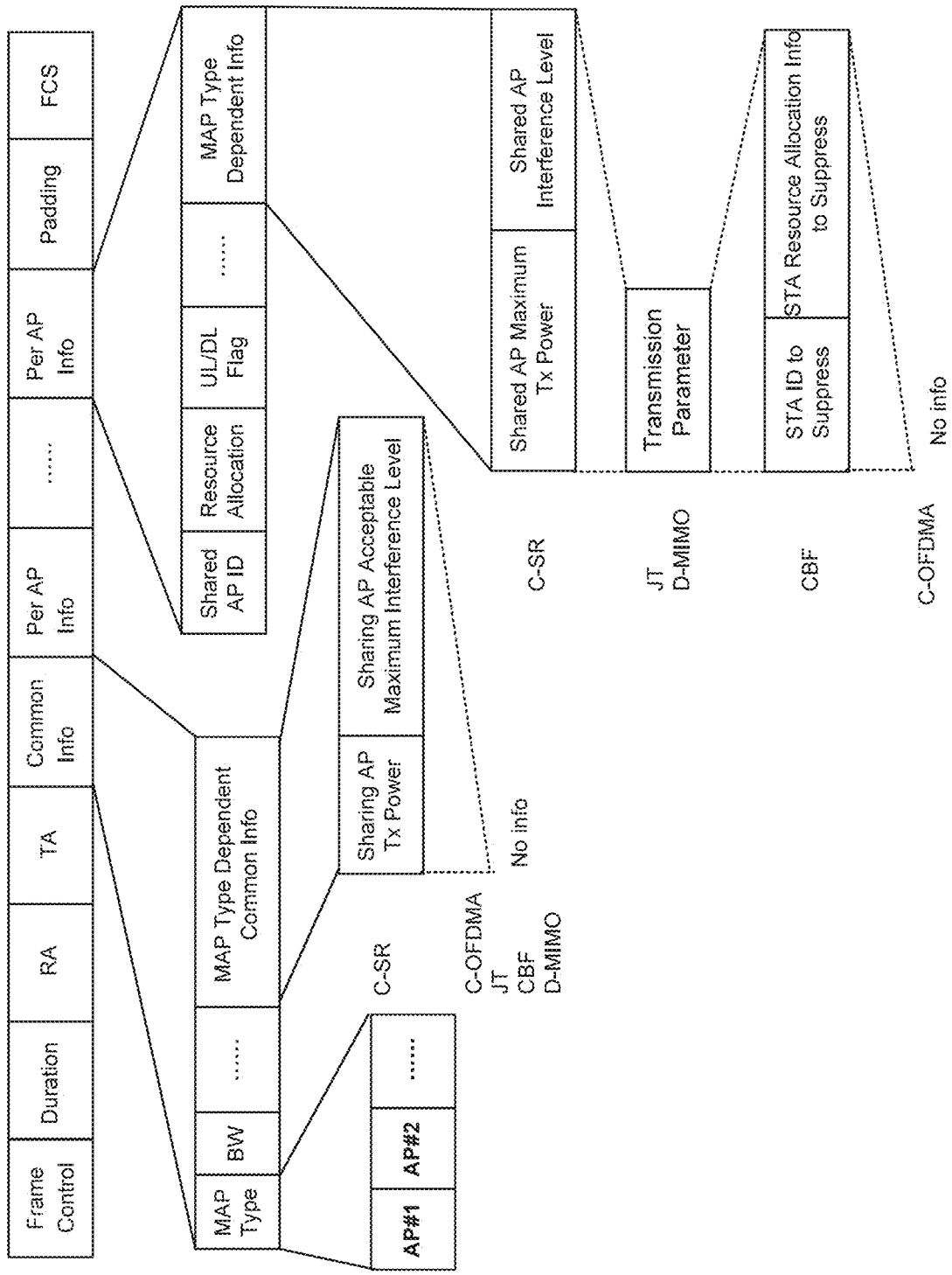
FIG. 15 illustrates an exemplary MAP Trigger frame format according to Embodiment 4.

FIG. 15 illustrates an exemplary MAP Trigger frame format according to the present embodiment.

For example, as illustrated in FIG. 15, MAP types of the respective plurality of Shared APs (e.g., AP #1, AP #2, . . . ) may be configured (in other words, indicated) in a MAP Type field in a Common Info field.

Note that the frame illustrated in FIG. 15 being configured to MAP Trigger may be notified to Shared AP by Frame Control such as in Embodiment 1, or may be notified by Trigger Type such as in Embodiments 2 and 3.

Note that, in FIG. 15, common information (e.g., BW) that does not depend on a MAP type in a Common Info field may be the same as in Embodiment 1, for example.

Further, in FIG. 15, MAP type dependent common information (e.g., MAP Type Dependent Common Info) in a Common Info field may be the same as MAP type dependent common information (MAP Type Dependent Common Info) in Embodiment 1, for example.

For example, when at least one of MAP types of a plurality of Shared APs notified by a MAPTrigger frame is "C-SR", the MAP type dependent common information field may include Sharing AP Tx Power and Sharing AP Acceptable Maximum Interference Level. On the other hand, when any of MAP types of a plurality of Shared APs notified by a MAP Trigger frame is different from "C-SR" (any of C-OFDMA, JT, CBF, or D-MIMO), the MAP type dependent common information field may include no notification information.

Further, in FIG. 15, individual information (e.g., Shared AP ID, Resource Allocation, and UL/DL Flag) that is placed in a Per AP Info field and does not depend on a MAP type may be the same as that in Embodiment 1, for example.

Further, in FIG. 15, MAP type dependent information (e.g., MAP Type Dependent Info) in a Per AP Info field may be the same as MAP type dependent information (e.g., MAP Type Dependent Info) in Embodiment 1, for example.

As described above, in the present embodiment, AP 100 notifies another AP 100 of a MAP type for each of a plurality of Shared APs by a MAP Type field placed in a Common Info field in a MAP Trigger frame. Further, AP100 notifies another AP 100 of MAP type dependent common information (MAP Type Dependent Common Info) and MAP type dependent information (MAP Type Dependent Info) corresponding to the MAP type. In other words, in a MAP Trigger frame, the formats of MAP type dependent common information and MAP type dependent information are changed based on the MAP types of a plurality of Shared APs.

This configuration of a MAP Trigger frame allows AP 100 to notify another AP 100 of a control signal corresponding to each of the plurality of MAP types even when MAP Types are different between the plurality of Shared APs, which can enhance efficiency of signaling. Therefore, according to the present embodiment, communication efficiency of coordinated communication can be enhanced.

Embodiment 5

The configuration of APs and STAs according to the present embodiment may be the same as that in Embodiment 1.

In the present embodiment, for example, similarly to Embodiment 4, a case where a MAP type is different between a plurality of Shared APs will be described.

When a MAP type is different between Shared APs, AP 100 (Sharing AP) may, for example, notify another AP 100 (Shared AP) of a MAP type for each of a plurality of Shared APs in a Per AP info. In other words, a MAP type (information indicating the type of coordinated communication) for each of the plurality of Shared APs may be included in Per AP Info (e.g., individual information).

Further, AP 100 may, for example, determine (or change) a format of MAP type dependent information (e.g., MAP Type Dependent Info) based on a MAP type notified to each of a plurality of Shared APs.

Figure 16:
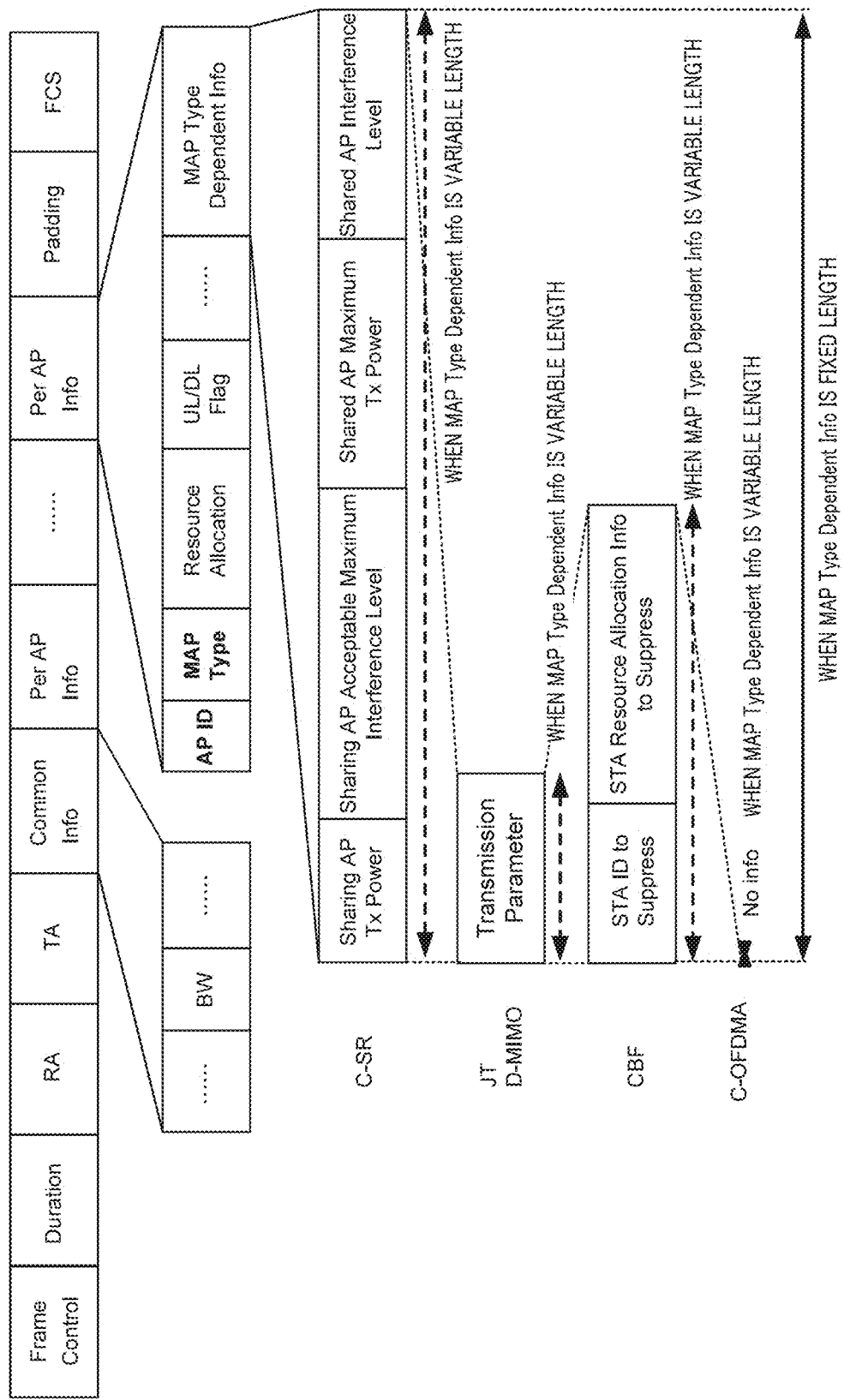
FIG. 16 illustrates an exemplary MAP Trigger frame format according to Embodiment 5.

FIG. 16 illustrates an exemplary MAP Trigger frame format according to the present embodiment.

For example, as illustrated in FIG. 16, MAP types of the respective plurality of Shared APs may be configured (in other words, indicated) in a MAP Type field in a Per AP Info field.

Note that the frame illustrated in FIG. 16 being configured to MAP Trigger may be notified to Shared AP by Frame Control as described in Embodiment 1, or may be notified by Trigger Type as described in Embodiments 2 and 3.

In FIG. 16, common information that is common to a plurality of Shared APs and does not depend on a MAP type may be included in a Common Info field, for example. The common information that does not depend on a MAP type may include information on bandwidth (BW), for example.

Further, in FIG. 16, individual information (in other words, notification information common to STAs 200 associating with Shared AP) for each Shared AP may be configured in a Per AP Info field. The individual information for each Shared AP may include individual information that does not depend on a MAP type and individual information that depends on a MAP type, for example.

Individual information that does not depend on a MAP type may include, for example, a Shared AP ID (AP ID), a MAP Type, Resource Allocation, and a UL/DL Flag.

Further, the individual information that depends on a MAP type (e.g., MAP type dependent information (MAP Type Dependent Info) may include the following information, for example.

For C-SR: Shared AP Tx Power, Sharing AP Acceptable Maximum Interference Level, Shared AP Maximum Tx Power, Shared AP Interference Level For JT or D-MIMO: Transmission Parameter (e.g., MCS, Sequence Number, . . . )

For CBF: STA ID to Suppress, STA Resource Allocation Info to Suppress

For C-OFDMA: None

In this case, a Per AP Info field length may be, for example, a fixed length or a variable length. In other words, the size of Per AP Info (individual information) may be common to MAP types, or may be different for each MAP type.

For example, when a Per AP Info field length is a fixed length, MAP type dependent information (MAP Type Dependent Info) may be configured to a fixed length regardless of a MAP type. For example, a Per AP Info field length may be configured (e.g., may be aligned) based on a format of a MAP type having a larger size (e.g., the largest size) among Per AP Info field lengths corresponding to respective MAP types. For example, when the size of MAP type dependent information corresponding to a certain MAP type is shorter than the fixed length of the Per AP Info field, the remaining area may be configured as a Reserved field.

When Per AP Info field length is a fixed length, each Shared AP can, for example, identify a placement position of the MAP type dependent information corresponding to the Shared AP regardless of a MAP type of another Shared AP, and thus processing (reading processing) for Per AP Info can be simplified.

Further, for example, when a Per AP Info field length is a variable length, the length of MAP type dependent information (MAP Type Dependent Info) may be configured based on a MAP type. Shared AP may identify a Per AP info field length of each Shared AP based on a MAP type of the Per AP Info corresponding to each Shared AP.

When a Per AP Info field length is a variable length, MAP type dependent information whose size corresponds to a MAP type configured to each Shared AP is notified, and thus the amount of signaling can be reduced compared to a case where a Per AP Info field is a fixed length.

As described above, in the present embodiment, AP 100 notifies another AP 100 of a MAP type for each of a plurality of Shared APs by a MAP Type field placed in a Per AP Info field in a MAP Trigger frame. Further, AP 100 notifies another AP 100 of MAP type dependent information (MAP Type Dependent Info) corresponding to a MAP type. In other words, in a MAP Trigger frame, the format of MAP type dependent information is changed based on MAP types of a plurality of Shared APs.

This configuration of a MAP Trigger frame allows AP 100 to notify another AP 100 of a control signal corresponding to each of the plurality of MAP types even when MAP Types are different between the plurality of Shared APs, which can enhance efficiency of signaling. Therefore, according to the present embodiment, communication efficiency of coordinated communication can be enhanced.

Comparison of Embodiments 4 and 5

FIG. 17 illustrates a comparative example of complexities of processing and the amounts of signaling relating to MAP Trigger frame formats in Embodiment 4 and Embodiment 5, respectively. Note that FIG. 17 illustrates a case of Embodiment 4 in which a Per AP Info field length is a variable length, and illustrates cases of Embodiment 5 in which a Per AP Info field length is a fixed length and a variable length.

As illustrated in FIG. 17, when a Per AP Info field length is a fixed length in Embodiment 5, the complexity of processing may be reduced and the amount of signaling may be increased compared to Embodiment 4. Further, as illustrated in FIG. 17, when a Per AP Info field length is a variable length in Embodiment 5, the complexity of processing may be increased and the amount of signaling may be reduced compared to Embodiment 4.

For example, when the reduction in the processing complexity is prioritized, the format of Embodiment 5 in which a Per AP Info field length is a fixed length may be applied (or selected). Further, for example, when the reduction in the signaling amount is prioritized, the format of Embodiment 5 in which a Per AP Info field length is a variable length may be applied (or selected). Further, for example, when the balance between the reduction in the processing complexity and the reduction in the signaling amount is prioritized, the format of Embodiment 4 may be applied (or selected).

Embodiment 6

The configuration of APs and STAs according to the present embodiment may be the same as that in Embodiment 1.

In the present embodiment, for example, a case where a MAP type is different between a plurality of STAs 200 will be described. Note that the present embodiment assumes a case where Sharing AP determines resource allocation for each STA associating with (connecting to) Shared AP, as an example.

When a MAP type is different between STAs 200, AP 100 (Sharing AP) may notify Share AP of a MAP type in a "Per STA Info" field (or referred to as terminal individual information), which is placed in a Per AP info field and is individual information for each STA 200. In other words, a MAP type (information indicating the type of coordinated communication) for each STA 200 may be included in Per STA Info (e.g., terminal individual information).

Further, AP 100 may, for example, determine (or change) a format of MAP type dependent information (e.g., MAP Type Dependent Info) in a Per STA info field based on MAP types of a respective plurality of STAs 200.

Figure 18:
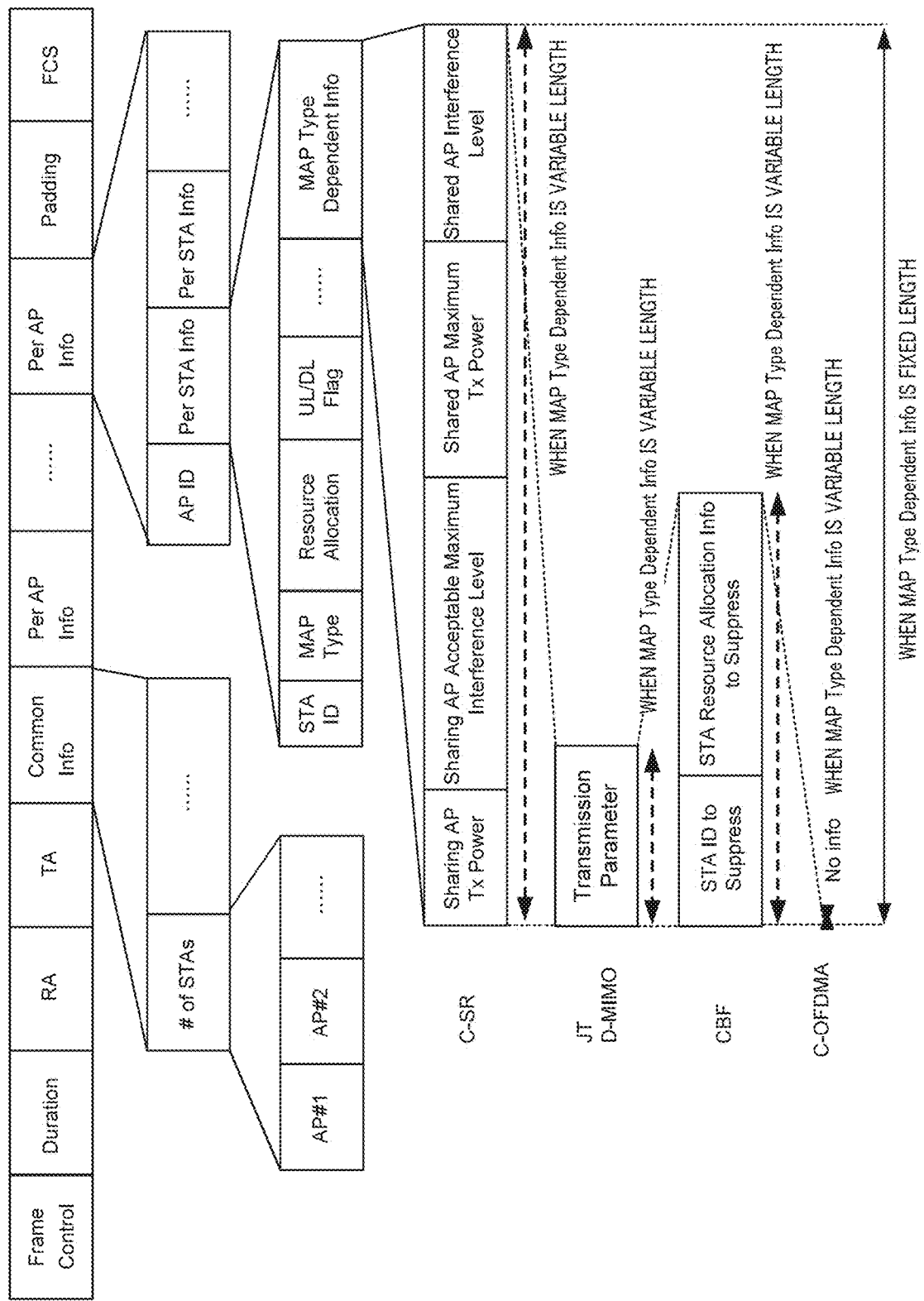
FIG. 18 illustrates an exemplary MAPTrigger frame format according to Embodiment 6.

FIG. 18 illustrates an exemplary MAP Trigger frame format according to the present embodiment.

For example, as illustrated in FIG. 18, information relating to the number of STAs 200 associating with each of a plurality of Shared APs (e.g., AP #1, AP #2, . . . ) may be included in a Common Info field. For example, the number of Per STA Info fields to be placed in each Per AP Info field may be determined based on the information relating to the number of the STAs 200. For example, as illustrated in FIG. 18, the number of STAs for each Shared AP may be specified in a Common Info field. Alternatively, the number of STAs (e.g., the maximum number of STAs) common to a plurality of Shared APs may be specified in a Common Info field, and the Shared AP whose number of STAs is less than the specified number may be filled with Padding. In FIG. 18, for example, a case where information relating to the number of STAs is included in Common Info will be described, but the information may be placed in Per AP Info.

Further, MAP types are not limited to being configured in a Per STA Info field in a Per AP Info field as illustrated in FIG. 18, and may be configured in combination with the method of Embodiment 1, for example. For example, the fact that there are a plurality of MAP types may be notified to Shared AP by information relating to the total MAP type (e.g., "Total MAP Type") in Common Info. Further, for example, information (MAP Type Index) relating to specifying a MAP type for each Shared AP from the total MAP type (Total MAP Type) notified in Common Info may be notified to Shared AP in Per STA Info.

Figure 19:
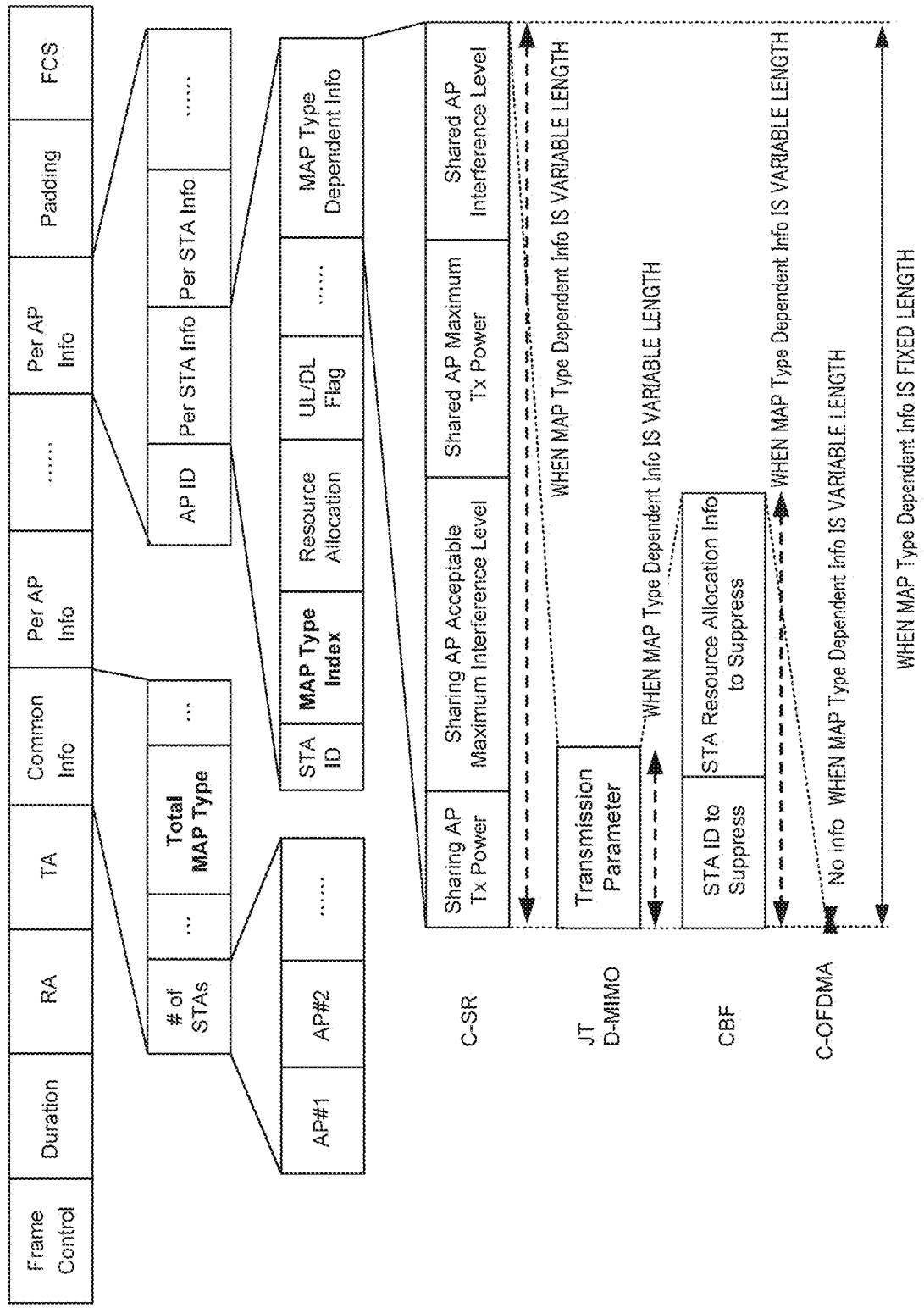
FIG. 19 illustrates another exemplary MAP Trigger frame format according to Embodiment 6.
Figure 20:
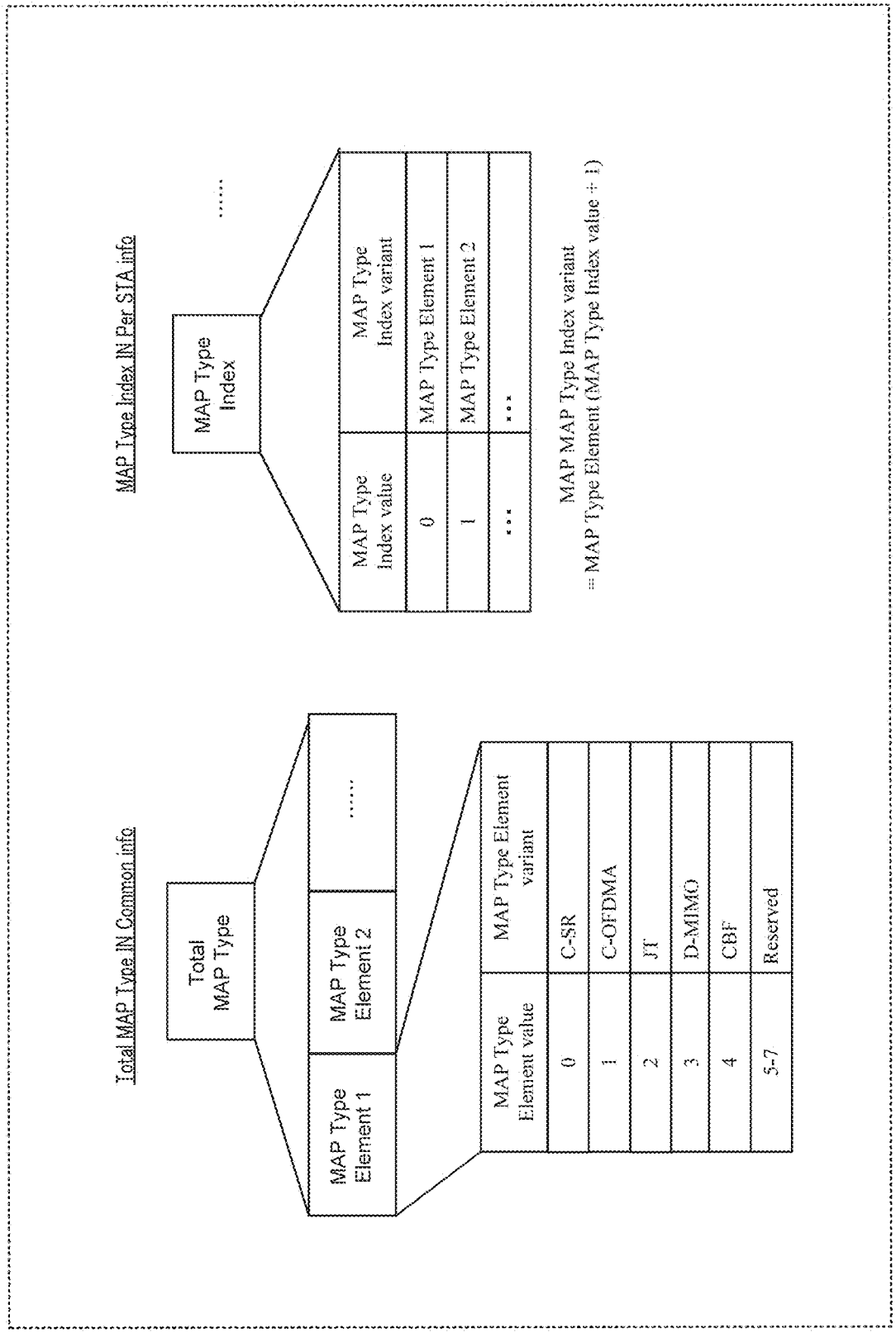
FIG. 20 illustrates exemplary definitions of a Total MAP type and a MAP type Index.

FIG. 19 illustrates a method combined with the method of Embodiment 1 regarding the above-described MAP type specification. FIG. 20 illustrates an exemplary definition of Total MAP Type in a Common Info field and an exemplary definition of MAP Type Index in Per STA Info.

As illustrated in FIG. 20, Total MAP Type may notify that there are a plurality of MAP types, on a plurality of MAP Type Elements (e.g., MAP Type Element 1, 2, . . . ). In each MAP Type Element, for example, any of the plurality of MAP types (in FIG. 20, any of 0 to 4) may be configured.

Further, as illustrated in FIG. 20, MAP Type Index may notify MAP Type Element corresponding to a MAP type of each STA 200, for example.

Shared AP may identify a MAP type corresponding to each STA 200 based on MAP Type Index in accordance with the following equation, for example.

MAP Type Index variant=MAP Type Element(MAP Type Index value+1)

For example, a case where MAP Type Index=1 corresponds to MAP Type Element 2, and thus Shared AP may identify a MAP type corresponding to the MAP Type Element value of MAP Type Element 2 in Total MAP Type. Note that the relation between Total MAP Type and MAP Type Index is not limited to the relation illustrated in FIG. 20, and may be another relation.

Further, in FIG. 18 and FIG. 19, individual information individual for STA 200 may be configured in Per STA Info in a Per AP Info field, for example. The individual information for each STA 200 may include individual information that does not depend on a MAP type (in other words, information common to a plurality of MAP types) and individual information that depends on a MAP type (in other words, information different between MAP types).

Individual information that does not depend on a MAP type may include, for example, an ID of STA (STA ID), a MAP Type, Resource Allocation, and a UL/DL Flag.

Further, the individual information that depends on a MAP type (e.g., MAP type dependent information (MAP Type Dependent Info) may, for example, include the following information, similarly to Embodiment 5.

For C-SR: Shared AP Tx Power, Sharing AP Acceptable Maximum Interference Level, Shared AP Maximum Tx Power, Shared AP interference Level For JT or D-MIMO: Transmission Parameter (e.g., MCS, Sequence Number, . . . )

For CBF: STA ID to Suppress, STA Resource Allocation Info to Suppress

For C-OFDMA: None

Note that Medium Access Control (MAC) address (48 bit) may be used for STA ID as an indication to STA 200 that is not associated with Shared AP, for example. Alternatively, an identifier of STA called "Short ID" whose number of bits is less than that of MAC address may be defined for STA ID. This allows reduction in the overhead of STA ID. Short ID may be defined with being included in Association ID (AID) specified in 11ax, and may be allocated to Reserved of AID 12, for example.

Further, a Per STA Info field length may be, for example, as illustrated in FIGS. 18 and 19, a fixed length or a variable length, similarly to the Per AP Info field in Embodiment 5. In other words, the size of Per STA Info (terminal individual information) may be common to MAP types, or may be different for each MAP type. The complexities of processing and the signaling amounts in both cases where a Per STA Info field length is fixed length and a variable length are the same as those of Per AP Info in Embodiment 5.

Further, for example, when Share AP can identify a field corresponding to the Shared AP in a MAP Trigger frame, such as a case where the order of Shared APs is notified to Shared APs in advance, the ID (e.g., AP ID) of Shared AP in a Per AP info field illustrated in FIG. 18 and FIG. 19 can be omitted.

As described above, in the present embodiment, AP 100 notifies another AP 100 of a MAP type for each of a plurality of STAs 200 by a MAP Type field placed in a Per STA Info field in a MAP Trigger frame. Further, AP 100 notifies another AP 100 of MAP type dependent information (MAP Type Dependent Info) corresponding to a MAP type. In other words, in a MAP Trigger frame, the format of MAP type dependent information is changed based on MAP types of a plurality of STAs 200.

This configuration of a MAP Trigger frame allows AP 100 to notify another AP 100 of a control signal corresponding to each of the plurality of MAP types even when MAP types are different between the plurality of STAs 200, which can enhance efficiency of signaling. Therefore, according to the present embodiment, communication efficiency of coordinated communication can be enhanced.

Note that, in the present embodiment, a case has been described in which Sharing AP determines resource allocation of each STA associating with (connecting to) Shared AP, but the present embodiment is not limited thereto, and Shared AP may determine resource allocation of each STA associating with Shared AP.

Embodiment 7

The configuration of APs and STAs according to the present embodiment may be the same as that in Embodiment 1.

In the present embodiment, for example, a case will be described in which MAP types are different between a plurality of Shared APs and MAP types of STAs 200 under each Shared AP are common.

AP 100 (Sharing AP) may, for example, place Per STA Info for each STA 200 in a Per AP Info field, and may notify another AP 100 (Shared AP) of a MAP type common to STAs 200 in a field different from Per STA Info in a Per AP Info field. In other words, a MAP type (information indicating the type of coordinated communication) for each of the plurality of Shared APs may be included in Per AP Info (e.g., individual information).

Further, AP 100 may, for example, determines (or change) a format of MAP type dependent information (e.g., MAP Type Dependent Info) in Per STA Info based on a MAP type notified for each of a plurality of Shared APs.

Figure 21:
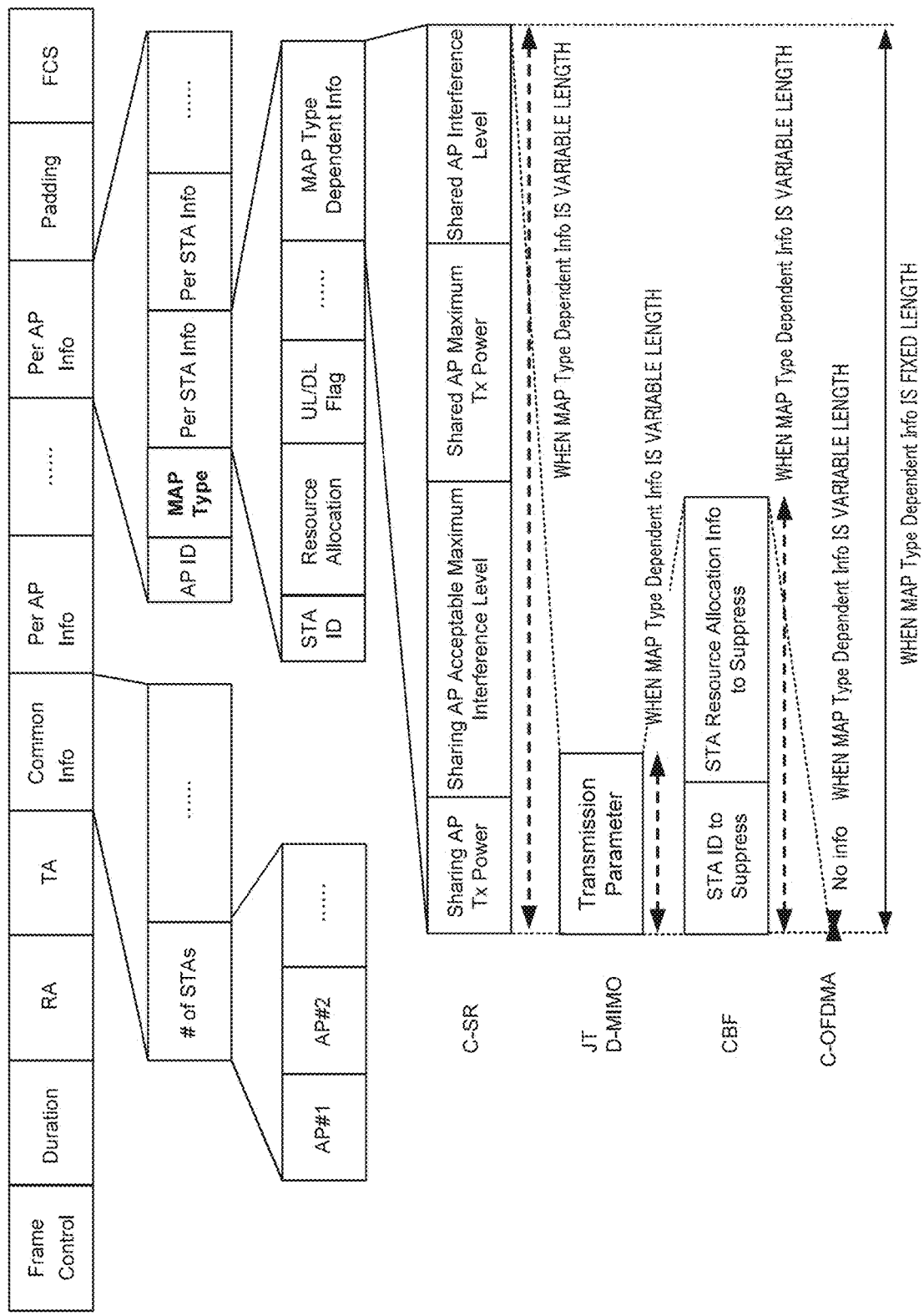
FIG. 21 illustrates an exemplary MAP Trigger frame format according to Embodiment 7.

FIG. 21 illustrates an exemplary MAP Trigger frame format according to the present embodiment.

For example, as illustrated in FIG. 21, similarly to Embodiment 6, information relating to the number of STAs 200 associating with each of a plurality of Shared APs (e.g., AP #1, AP #2, . . . ) may be included in a Common Info field. For example, the number of Per STA Info fields placed in each Per AP Info fields may be determined based on the information relating to the number of STAs 200.

Note that, for the method of specifying the number of STAs, similarly to Embodiment 6, the number of STAs for each Shared AP may be specified, or Shared AP whose number of STAs is less than the specified number may be filled with Padding. In FIG. 21, similarly to Embodiment 6, a case where information relating to the number of STAs is included in Common Info has been described, but the information may be placed in Per AP Info.

Further, a MAP type is not limited to be configured in a Per AP Info field, and for example, similarly to Embodiment 6, the fact that there are a plurality of MAP types may be notified to Shared AP by information relating to the total MAP type (Total MAP Type) notified in Common Info, and information relating to specifying a MAP type for each Shared AP from the total MAP type (Total MAP Type) notified in Common Info may be notified to Shared AP in Per AP Info.

In FIG. 21, a MAP type (MAP Type) notified by each Per AP Info field may be common to STAs 200 under the Shared AP corresponding to the Per AP Info.

Further, in FIG. 21, individual information individual for STA 200 may be configured in Per STA Info in a Per AP Info field, for example. The individual information for each STA 200 may include individual information that does not depend on a MAP type (in other words, information common to a plurality of MAP types) and individual information that depends on a MAP type (in other words, information different between MAP types).

The individual information that does not depend on a MAP type may include, for example, an ID of STA 200 (STA ID), Resource Allocation, and a UL/DL Flag. Further, the individual information that depends on a MAP type may be the same as in Embodiment 6, for example.

Further, as illustrated in FIG. 21, a Per STA Info field length may be, for example, a fixed length or a variable length, similarly to the Per AP Info field in Embodiment 5. In other words, the size of Per STA Info (terminal individual information) may be common to MAP types, or may be different for each MAP type. The complexities of processing and the signaling amounts in both cases where a Per STA Info field length is fixed length and a variable length are the same as those of Per AP Info in Embodiment 5.

Further, for example, when Share APs can identify a field corresponding to the Shared AP in a MAP Trigger frame, such as a case where the order of Shared APs is notified to Shared Aps in advance, the ID (e.g., AP ID) of Shared AP in a Per AP info field illustrated in FIG. 21 can be omitted, similarly to Embodiment 6.

As described above, in the present embodiment, AP 100 notifies another AP 100 of a MAP type common to a plurality of STAs 200 under each Shared AP by a MAP Type field placed in a Per AP Info field in a MAP Trigger frame. Thus, the signaling amount relating to the notification of MAP type can be reduced.

Further, AP 100 notifies another AP 100 of MAP type dependent information (MAP Type Dependent Info) corresponding to a MAP type. In other words, in a MAP Trigger frame, the format of MAP type dependent information is changed based on a MAP type of Shared AP.

This configuration of a MAP Trigger frame allows AP 100 to notify another AP 100 of a control signal corresponding to each of the plurality of MAP types even when MAP Types are different between the plurality of Shared APs, which can enhance efficiency of signaling. Thus, according to the present embodiment, communication efficiency of coordinated communication can be enhanced.

Embodiment 8

The configuration of APs and STAs according to the present embodiment may be the same as that in Embodiment 1.

In the present embodiment, for example, a case where a MAP type is different between a plurality of STAs 200 will be described.

When MAP types are different between STAs 200, AP 100 (Sharing AP) may notify another AP 100 (Shared AP) of a MAP type of each STA 200 in a Per STA Info (e.g., terminal individual information) field.

Further, AP 100 may, for example, determines (or change) formats of MAP type dependent information (e.g., MAP Type Dependent Info) in Per STA Info based on a MAP type notified for each of a plurality of STAs 200.

Figure 22:
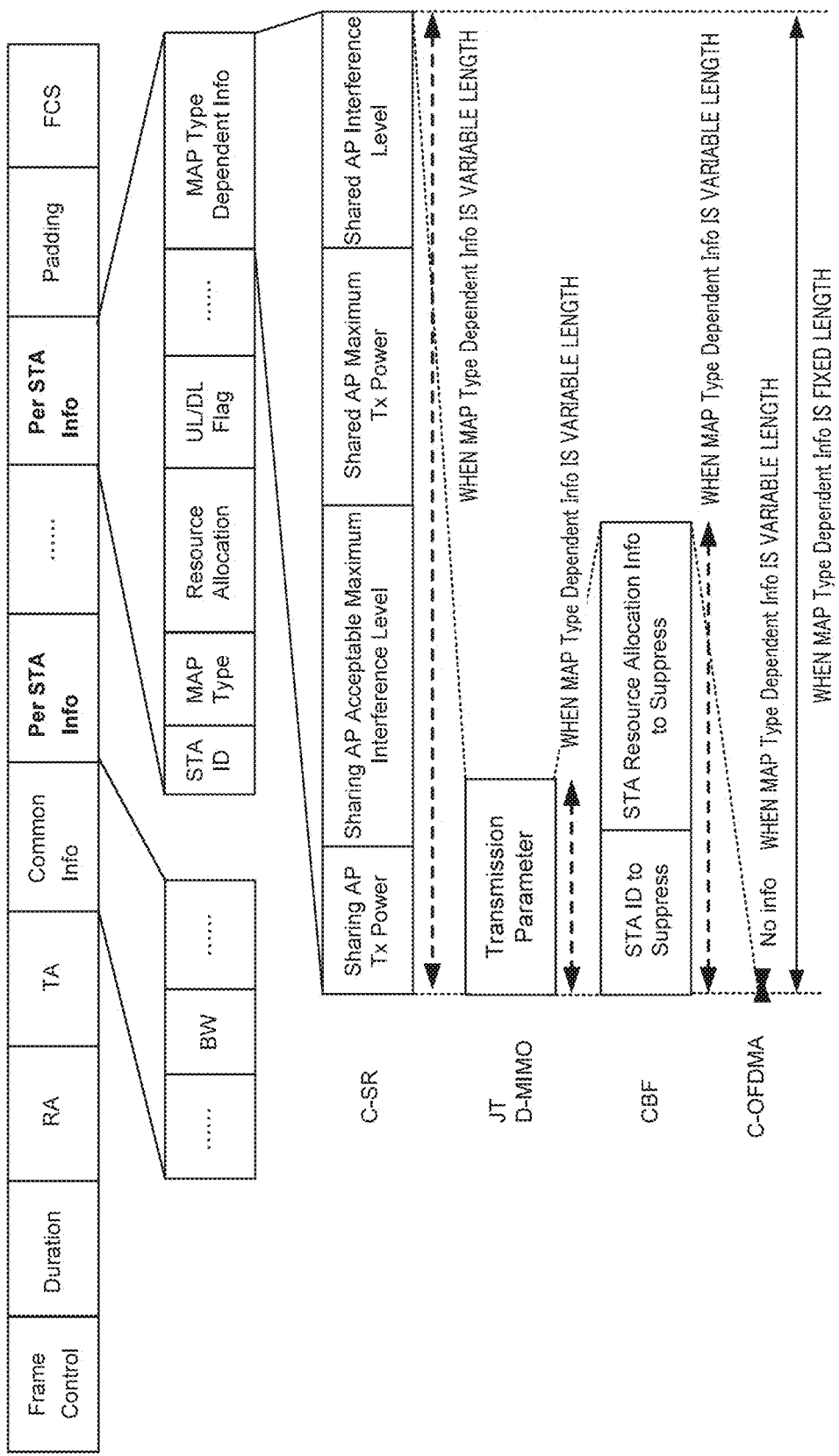
FIG. 22 illustrates an exemplary MAP Trigger frame format according to Embodiment 8.

FIG. 22 illustrates an exemplary MAP Trigger frame format according to the present embodiment.

As illustrated in FIG. 22, a Per STA Info field may be placed in the same layer as a Common Info field in a MAP Trigger frame. In other words, in FIG. 22, Per STA Info field may be placed instead of Per AP Info field in a format illustrated in FIG. 1.

Further, in FIG. 22, individual information individual to STA 200 may be configured in Per STA Info. The individual information for each STA 200 may include individual information that does not depend on a MAP type (in other words, information common to a plurality of MAP types) and individual information that depends on a MAP type (in other words, information different between MAP types).

Individual information that does not depend on a MAP type may include, for example, an ID of STA 200 (STA ID), a MAP Type, Resource Allocation, and a UL/DL Flag.

Further, the individual information different between MAP types (e.g., MAP type dependent information (MAP Type Dependent Info) may, for example, include the following information, similarly to Embodiment 5.

For C-SR: Shared AP Tx Power, Sharing AP Acceptable Maximum Interference Level, Shared AP Maximum Tx Power, Shared AP interference Level For JT or D-MIMO: Transmission Parameter (e.g., MCS, Sequence Number, . . . )

For CBF: STA ID to Suppress, STA Resource Allocation Info to Suppress

For C-OFDMA: None

Figure 23:
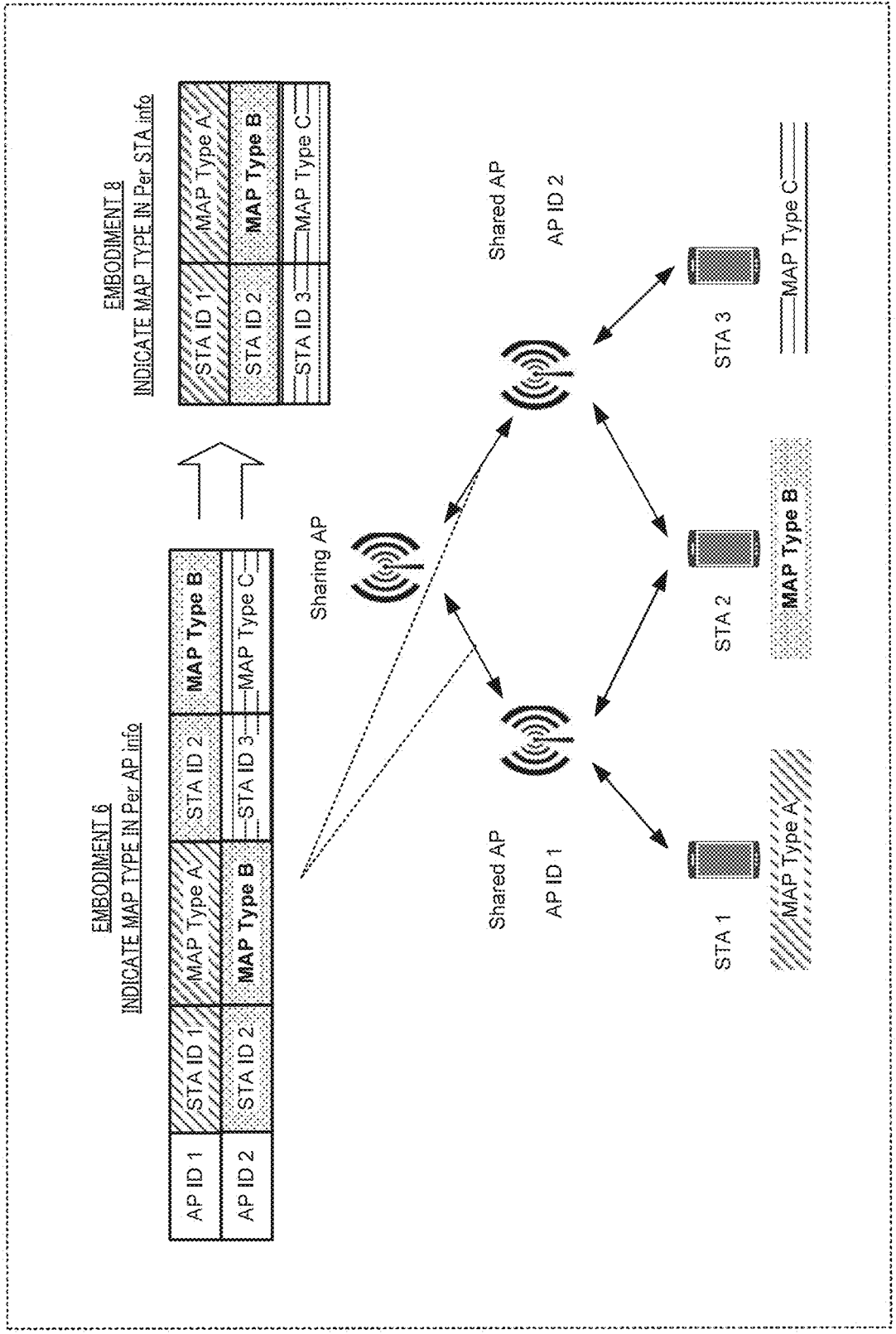
FIG. 23 illustrates an exemplary MAP type indication when a MAP type differs for each Station (STA)

FIG. 23 illustrates an exemplary indication of a MAP type when a MAP type differs for each STA 200. FIG. 23 compares the method of Embodiment 6 and the method of Embodiment 8 as an example.

Further, in FIG. 23, for example, STA 200 under Shared AP of AP ID 1 is STA 1 and STA 2, and STA 200 under Shared AP of AP ID 2 is STA 2 and STA 3. As illustrated in FIG. 23, STA 2 performs coordinated communication with each of Shared APs of AP ID 1 and AP ID 2.

For example, a method of Embodiment 6 is a method for indicating a MAP type for each STA 200 under Shared AP by Per STA Info of each Per AP info. Therefore, in the method of Embodiment 6, for example, MAP types of subordinate STA is indicated for each Shared AP. In the example illustrated in FIG. 23, MAP types of STA 1 and STA 2 subordinate of Shared AP of AP ID 1 are indicated in Per AP info corresponding to AP ID 1, and MAP types of STA 2 and STA 3 under Shared AP of AP ID 2 are indicated in Per AP Info corresponding to AP ID 2.

On the other hand, for example, the method of Embodiment 8 is a method for indicating a MAP type for each STA 200 by Per STA Info. Therefore, in Embodiment 8, for example, a MAP type for each STA 200 is indicated regardless of Shared AP with which STA 200 associates. In the example illustrated in FIG. 23, a MAP type for each of STA 1, 2, and 3 is indicated in Per STA Info.

For example, focusing on STA 2 (STA ID 2) in FIG. 23, the MAP type is specified in two Per AP Info fields corresponding to AP ID 1 and AP ID 2 in the method of Embodiment 6, but the MAP type is specified in one Per STA Info field corresponding to STA ID 2 in the method of Embodiment 8. Therefore, according to the method of Embodiment 8, signaling relating to MAP types can be reduced as compared with the method of Embodiment 6.

Further, as illustrated in FIG. 22, a Per STA Info field length may be a fixed length or a variable length, similarly to the Per AP Info field in Embodiment 5, for example. In other words, the size of Per STA Info (terminal individual information) may be common to MAP types, or may be different for each MAP type. The complexities of processing and the signaling amounts in both cases where a Per STA Info field length is fixed length and a variable length are the same as those of Per AP Info in Embodiment 5.

Note that, for example, when STA 200 is specified in a MAP Trigger frame, each Shared AP can identify Shared AP with which the STA 200 associates (holds connection relation), and thus Shared AP ID (AP ID) need not be indicated to Shared AP in a MAP Trigger frame.

Further, when STA 200 is specified with STA ID in a MAP Trigger frame, a unique STA ID for each STA 200 under a plurality of Shared APs is allocated. For example, when AID or AID 12 are used for allocation of the unique STA ID, the methods are as follows:

Integrate management so as to share an ID space (e.g., designated area) through the entire system to give unique AID. In this method, for example, Sharing AP may manage AID and give AID to STA 200 directly or through Shared AP.

Negotiate so as to use an exclusive area of an AID space in each Shared AP.

As described above, in the present embodiment, AP 100 notifies another AP 100 of a MAP type for each of a plurality of STAs 200 in a MAP Type field placed in a Per STA Info field in a MAP Trigger frame. Further, AP 100 notifies another AP 100 of MAP type dependent information (MAP Type Dependent Info) corresponding to a MAP type. In other words, in a MAP Trigger frame, the format of MAP type dependent information is changed based on a MAP type for each STA 200.

This configuration of a MAP Trigger frame allows AP 100 to notify another AP 100 of a control signal corresponding to each of the plurality of MAP types even when MAP types are different between the plurality of STAs 200, which can enhance efficiency of signaling. Further, for example, duplication of STA information such as a MAP type can be suppressed, and thus signaling can be reduced. Therefore, according to the present embodiment, communication efficiency of coordinated communication can be enhanced.

Comparison of Embodiments 6, 7, and 8

FIG. 24 illustrates a comparative example of complexities of processing and the amounts of signaling relating to MAP Trigger frame formats in Embodiments 6, 7, and 8, respectively.

For example, in Embodiment 6, Per STA Info is placed in a Per AP Info field, and a MAP type is indicated in Per STA Info.

Further, for example, in Embodiment 7, Per STA Info is placed in a Per AP Info field, and a MAP type common to STA 200 is indicated in an area different from Per STA Info in a Per AP Info field.

For example, in Embodiment 8, Per AP Info is not placed, and a MAP type is indicated in Per STA Info.

As illustrated in FIG. 24, the complexities of processing decrease in the order of Embodiment 7, 6, 8, for example. Further, as illustrated in FIG. 24, the signaling amounts decrease in the order of Embodiments 8, 7, 6, for example.

For example, when the reduction in the processing complexity is prioritized, the format of Embodiment 7 may be applied (or selected). Further, for example, when the reduction in the signaling amount is prioritized, the format of Embodiment 8 may be applied (or selected).

Embodiment 9

The configurations of AP and STA according to the present embodiment may be the same as those in Embodiment 1.

In the present embodiment, for example, a method of switching methods (or MAP Trigger frame formats) between Embodiment 4 to Embodiment 8 will be described.

For example, the format type applied in a MAP Trigger frame (e.g., any of the frame formats of Embodiment 4 to Embodiment 8) may be indicated in a Common Info field.

Figure 25:
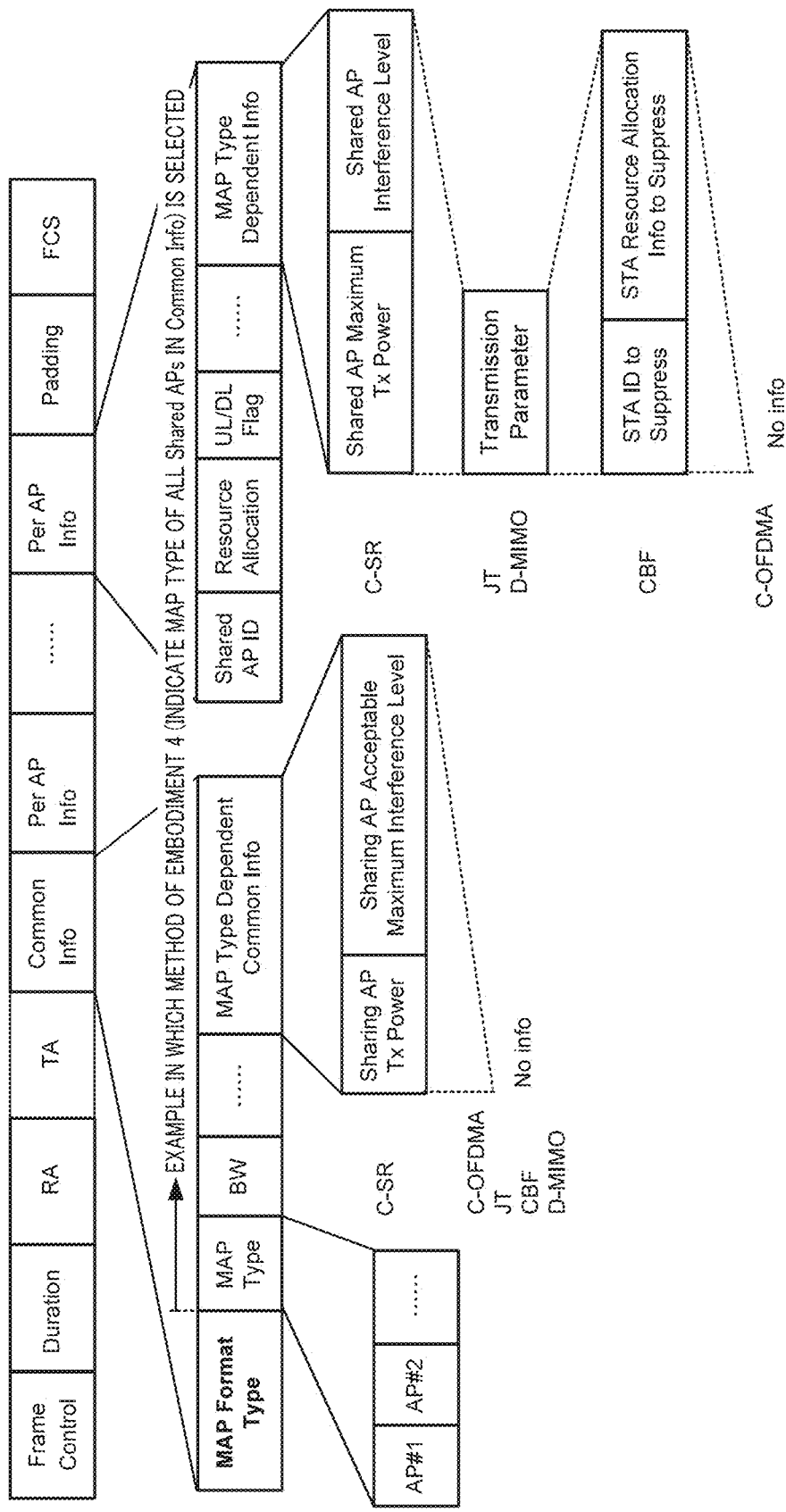
FIG. 25 illustrates an exemplary MAPTrigger frame format according to Embodiment 9.

FIG. 25 illustrates an exemplary MAP Trigger frame format according to the present embodiment. FIG. 25 illustrates an example in which a frame format according to Embodiment 4 is applied as an example.

As illustrated in FIG. 25, Common Info field may include, for example, information indicating the format type of a MAP Trigger frame (e.g., MAP Format Type). AP 100 may determine formats following MAP Format Type in a MAP Trigger frame based on the format type indicated in MAP Format Type, for example.

The format type specified by MAP Format Type may be, for example, any of the following formats.

Format indicating a MAP type of each Shared AP in a MAP type field of Common info (e.g., Embodiment 4).

Format indicating a MAP type in a Per AP Info field (e.g., Embodiment 5).

Format indicating a MAP type in a Per STA Info field in Per AP Info (e.g., Embodiment 6)

Format in which Per STA Info is placed in Per AP info and that indicates a MAP type common to STAs in an area different from Per STA Info in Per AP Info (e.g., Embodiment 7).

Format in which Per AP Info is not placed and that indicates a MAP type in a Per STA Info field (e.g., Embodiment 8).

The selection criterion of the format type includes, for example, the following methods.

For example, a format having a smaller number of total bits, or a format that is easier to be processed may be selected. For example, when there are a plurality of formats capable of indicating a configuration of a MAP type (e.g., a MAP type common to Shared APs, a MAP type for each Shared AP, or a MAP type for each STA 200) configured to Shared AR a format having a smaller number of total bits (in other words, a signaling amount) or a format that is easier to be processed (in other words, a format with less complicated processing) may be selected. Note that the selection criterion of the format type is not limited to these, and may be, for example, another criterion in accordance with the configuration status of MAP types for each Shared AP and STA 200 under each Shared AP.

For example, when MAP types are different for each Shared AP and MAP types are the same in each AP (e.g., between subordinate STAs 200), AP 100 (e.g., Sharing AP) may select the format of Embodiment 5, and when MAP types are different between Shared AP and STA 200 under the Shared AP, AP 100 may select the format of Embodiment 6.

As described above, AP 100 may select (switch) any one of a plurality of formats of a MAP Trigger frame based on the selection criterion, and transmit a MAP Trigger frame including information indicating the type of the selected format (e.g., MAP Format Type). The switching of the format allows AP 100 to select a format that is easier to be processed or a format whose signaling amount is smaller in accordance with the configuration status of a MAP type of each Shared AP and STA 200 under each Shared AP.

Note that in the present embodiment, a method for switching a MAP Trigger frame format from Embodiment 4 to Embodiment 8 has been described as an example, but the format candidate for switching is not limited thereto, and the format may be one of those of Embodiment 1 to Embodiment 8, for example.

Further, in the present embodiment, a case where a MAP Trigger frame format is specified by a MAP Format Type has been described as an example, but the present embodiment is not limited thereto, and a MAP Trigger frame format (a type of a format) is implicitly indicated to Shared AP based on another parameter, for example.

Embodiments of the present disclosure have been described above.

OTHER EMBODIMENTS

In the above-described embodiments, the same method (in other words, frame format configuration) may be applied to both DL and UL.

Further, in the above-described embodiment, an exemplary notification information relating to MAP in a MAP Trigger frame has been described, but the notified information is not limited to the information described in the above embodiments, and for example, another information may be added or at least some of the defined information may be deleted.

Further, in the above-described embodiment, an exemplary definition of Frame Control field (e.g., FIG. 8), an exemplary definition of a MAP type (e.g., FIG. 9 and FIG. 10), an exemplary definition of a Trigger Type subfield (e.g., FIG. 12 and FIG. 14), and an exemplary definition of Total MAP Type and MAP Type Index (e.g., FIG. 20) have been described, but the examples are not limited thereto, and another value may be defined to these definitions.

Further, in the above embodiment, the type of MAP has been described by the term "MAP type", but the present disclosure is not limited thereto, and another term may be used. For example, the type of MAP may be the term "Multi-AP coordination schemes", which is used in the discussing specification of 11be.

Further, in the above embodiment, AP indicating coordinated communication and AP to which coordinated communication is indicated have been described by the term "Sharing AP" and "Shared AP", respectively, but the present disclosure is not limited thereto, and another term may be used.

Further, the above-described embodiments have been described based on a format in 11be as an example, but the format to which the embodiment of the present disclosure is applied is not limited to the format of 11be. One embodiment of the present disclosure can also be applied to, for example, IEEE 802.11bd (Next Generation V2X (NGV)), which is a next generation standard from IEEE 802.11p, which is an on-vehicle standard.

The present disclosure can be realized by software, hardware, or software in cooperation with hardware. Each functional block used in the description of each embodiment described above can be partly or entirely realized by an LSI such as an integrated circuit, and each process described in each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration.

The technique of implementing an integrated circuit is not limited to the LSI, however, and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing.

If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus. The communication apparatus may comprise a transceiver and processing/control circuitry. The transceiver may comprise and/or function as a receiver and a transmitter. The transceiver, as the transmitter and receiver, may include an RF (radio frequency) module including amplifiers, RF modulators/demodulators and the like, and one or more antennas. Some non-limiting examples of such a communication apparatus include a phone (e. g, cellular (cell) phone, smart phone), a tablet, a personal computer (PC) (e. g, laptop, desktop, netbook), a camera (e. g, digital still/video camera), a digital player (digital audio/video player), a wearable device (e. g, wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e. g, an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

A base station according to the embodiment of the present disclosure includes: control circuitry, which in operation, determines a format of a control signal based on a type of coordinated communication; and transmission circuitry, which in operation, transmits the control signal to another base station in the format.

In the embodiment of the present disclosure, the control signal includes common information including information common to a plurality of base stations, and includes individual information individual to each of the plurality of the base stations, and the control circuitry determines a format of at least one of the common information and/or the individual information based on the type.

In the embodiment of the present disclosure, information indicating the type is included in a field for notifying the type in the common information.

In the embodiment of the present disclosure, information indicating the type is included in a field for notifying a trigger type in the common information.

In the embodiment of the present disclosure, in the common information, information triggering the coordinated communication is included in a field for notifying a trigger type, and information indicating the type is included in a field dependent on the trigger type.

In the embodiment of the present disclosure, information indicating the type for each of the plurality of base stations is included in the common information.

In the embodiment of the present disclosure, information indicating the type for each of the plurality of the base station is included in the individual information.

In the embodiment of the present disclosure, a size of the individual information is common to the types or different for each of the types.

In the embodiment of the present disclosure, the individual information includes terminal individual information individual to a terminal connecting to a base station corresponding to the individual information, and information indicating the type is included in the terminal individual information.

In the embodiment of the present disclosure, the control circuitry performs resource allocation for the terminal connecting to the other base station.

In the embodiment of the present disclosure, the control signal includes common information including information common to a plurality of base stations, and includes terminal individual information individual to each of a plurality of terminals, information indicating the type for each of the plurality of terminals is included in the terminal individual information, and the control circuitry determines the format of the terminal individual information based on the type.

In the embodiment of the present disclosure, a size of the terminal individual information is common to the types or different for each of the types.

In the embodiment of the present disclosure, the control circuitry selects any one of a plurality of the formats based on a selection criterion, and the transmission circuitry transmits the control signal including information indicating a type of the selected format.

In a communication apparatus according to the embodiment of the present disclosure, the base station determine a format of a control signal based on a type of coordinated communication, and transmits the control signal to another base station in the format.

The disclosure of Japanese Patent Application No. 2020-156398, filed on Sep. 17, 2020, including the specification, drawings and abstract, is incorporated herein by reference in its entirety.

INDUSTRIAL APPLICABILITY

An exemplary embodiment of the present disclosure is useful for radio communication systems.

REFERENCE SIGNS LIST

100 AP
101 Controller
102 STA control-signal generator
103 AP control-signal generator
104, 203 Transmission signal generator
105, 201 Radio transmitter/receiver
106, 202 Reception signal demodulator/decoder
200 STA

The invention claimed is:

1. A base station comprising:
control circuitry, which in operation, determines a format of a control signal based on a type of coordinated communication, the control signal including a first parameter field dependent on the type of coordinated communication and a second parameter field independent of the type of coordinated communication; and
transmission circuitry, which in operation, transmits the control signal to another base station in the format, wherein a length of the first parameter field dependent on the type of coordinated communication is variable according to the type of the coordinated communication.

2. The base station according to claim 1, wherein information indicating the type is included in the second parameter field.

3. The base station according to claim 1, wherein
the control signal includes terminal individual information individual to a terminal connecting to the another base station, and
information indicating the type is included in the terminal individual information.

4. The base station according to claim 3, wherein the control circuitry performs resource allocation for the terminal connecting to the other base station.

5. The base station according to claim 1, wherein
the control signal includes terminal individual information individual to each of a plurality of terminals,
information indicating the type for each of the plurality of terminals is included in the terminal individual information, and
the control circuitry determines the format of the terminal individual information based on the type.

6. The base station according to claim 5, wherein a size of the terminal individual information is common to the types or different for each of the types.

7. The base station according to claim 1, wherein
the control circuitry selects any one of a plurality of the formats based on a selection criterion, and
the transmission circuitry transmits the control signal including information indicating a type of the selected format.

8. A communication apparatus comprising:
a transmitter, which in operation, transmits information relating to a type of coordinated communication to a first base station; and
circuitry, which in operation, performs coordinated communication with a second base station in a format determined based on the information relating to the type of coordinated communication, wherein,
the format includes a first parameter field dependent on the type of coordinated communication and a second parameter field independent of the type of the coordinated communication, and
a length of the first parameter field dependent on the type of the coordinated communication is variable according to the type of the coordinated communication.

9. A communication method comprising:
determining, by a base station, a format of a control signal based on a type of coordinated communication, the control signal including a first parameter field dependent on the type of coordinated communication and a second parameter field independent of the type of coordinated communication; and
transmitting, by the base station, the control signal to another base station in the format, wherein a length of the first parameter field dependent on the type of the coordinated communication is variable according to the type of the coordinated communication.

10. A communication method comprising:
transmitting, by a communication apparatus, information relating to a type of coordinated communication to a first base station; and
performing, by the communication apparatus, coordinated communication with a second base station in a format including a first parameter field dependent on the type of coordinated communication and a second parameter field independent of the type of coordinated communication, based on the information relating to the type of coordinated communication, wherein,
a length of the first parameter field dependent on the type of the Coordinated communication is variable according to the type of the coordinated communication.

11. The base station according to claim 1, wherein the second parameter includes information identifying the another base station.

* * * * *